United States Patent
Liu et al.

(10) Patent No.: US 10,354,415 B2
(45) Date of Patent: Jul. 16, 2019

(54) METHOD AND APPARATUS FOR A SEAMLESS TEXTURE UNIT GENERATOR

(71) Applicant: Autodesk, Inc., San Rafael, CA (US)

(72) Inventors: Ning Liu, Shanghai (CN); Yang Shen, Suzhou (CN); Lei Wang, Shanghai (CN)

(73) Assignee: AUTODESK, INC., San Rafael, CA (US)

(*) Notice: Subject to any disclaimer, the term of this patent is extended or adjusted under 35 U.S.C. 154(b) by 32 days.

(21) Appl. No.: 15/700,803

(22) Filed: Sep. 11, 2017

(65) Prior Publication Data
US 2019/0080484 A1 Mar. 14, 2019

(51) Int. Cl.
| | |
|---|---|
| *G06T 11/00* | (2006.01) |
| *G06T 1/20* | (2006.01) |
| *G06T 11/20* | (2006.01) |
| *G06T 3/40* | (2006.01) |
| *G06F 3/048* | (2013.01) |
| *G06T 5/00* | (2006.01) |
| *G06F 3/0484* | (2013.01) |

(52) U.S. Cl.
CPC ............ *G06T 11/001* (2013.01); *G06T 1/20* (2013.01); *G06T 3/4023* (2013.01); *G06T 5/002* (2013.01); *G06T 11/203* (2013.01); *G06F 3/04847* (2013.01); *G06T 2200/24* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,594,854 A | * | 1/1997 | Baldwin | G06T 11/40 345/441 |
| 6,982,723 B1 | * | 1/2006 | Szymaniak | G06T 15/40 345/611 |
| 2002/0003543 A1 | * | 1/2002 | Deering | G06T 15/503 345/581 |
| 2002/0005862 A1 | * | 1/2002 | Deering | G06F 3/011 345/694 |

(Continued)

OTHER PUBLICATIONS

Perez, Patrick, et al., "Poisson image editing." ACM Transactions on Graphics. vol. 22. No. 3. ACM, 2003.

(Continued)

*Primary Examiner* — Wesner Sajous
(74) *Attorney, Agent, or Firm* — Gates & Cooper LLP

(57) ABSTRACT

A method, apparatus, system, and article of manufacture provide the ability to generate a texture unit for seamless tiling. A source image is obtained. A sample unit is identified from part of the source image where texture is of interest. The sample unit has multiple pixels including non-continuous border pixels and continuous pixels. The sample unit is split into multiple parts using a horizontal cut and/or a vertical cut. A shuffled sample unit is generated by moving each of the multiple parts to a center-symmetric position based on the horizontal cut and/or the vertical cut. The moving/shuffling moves the non-continuous border pixels to a center, and the continuous pixels to borders of the shuffled sample unit. A mask is generated by selecting the multiple pixels from the sample unit. The mask is overlaid on top of corresponding pixels in the shuffled sample unit to generate the texture unit.

20 Claims, 19 Drawing Sheets

(56) References Cited

U.S. PATENT DOCUMENTS

2002/0180748 A1* 12/2002 Popescu ................ G06T 15/205
 345/582
2004/0012600 A1* 1/2004 Deering ................ G06T 15/005
 345/506

OTHER PUBLICATIONS

Kwatra, Vivek, et al. "Graphcut textures: image and video synthesis using graph cuts." ACM Transactions on Graphics. vol. 22. No. 3. ACM, 2003.
Barnes, Connelly, et al., "PatchMatch: a randomized correspondence algorithm for structural image editing" ACM Transactions on Graphics 28.3 (2009): 24.

* cited by examiner

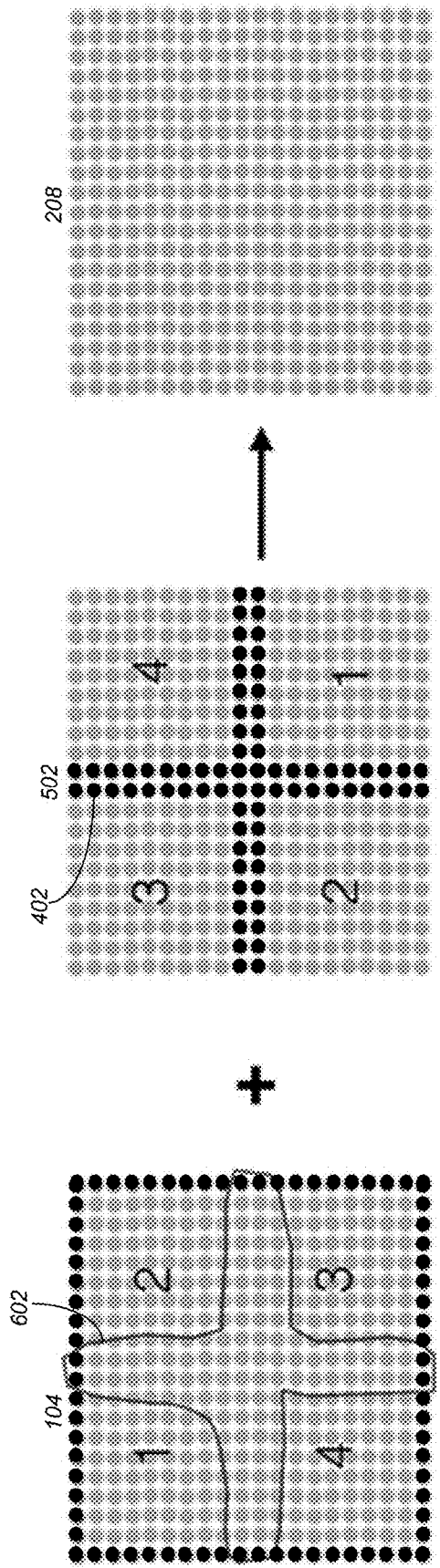
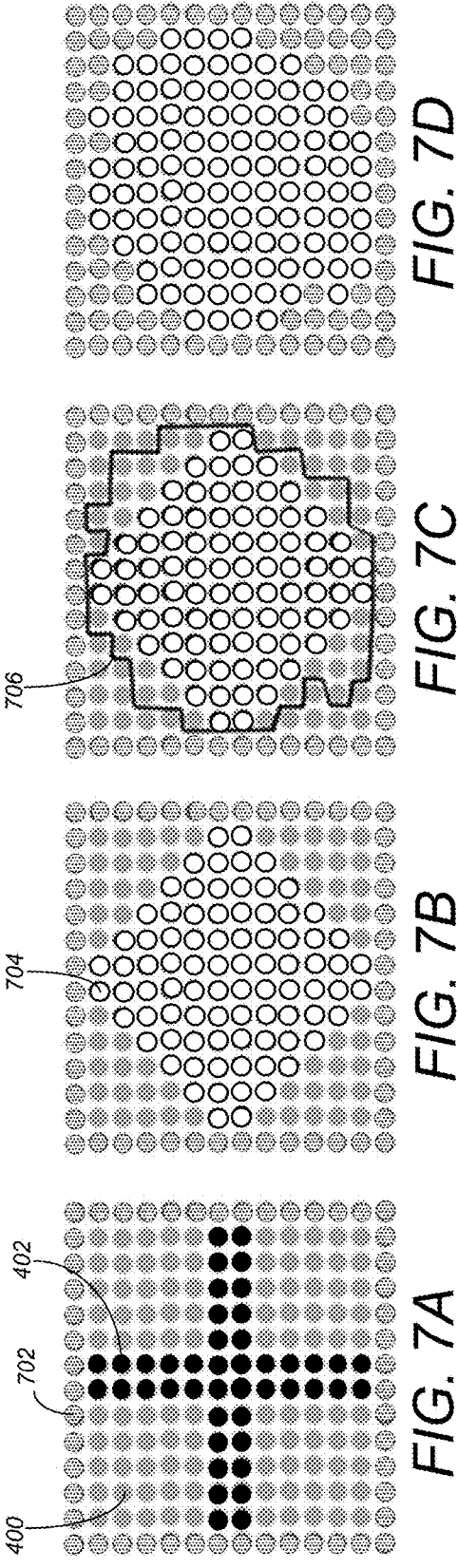
FIG. 6
FIG. 7A  FIG. 7B  FIG. 7C  FIG. 7D

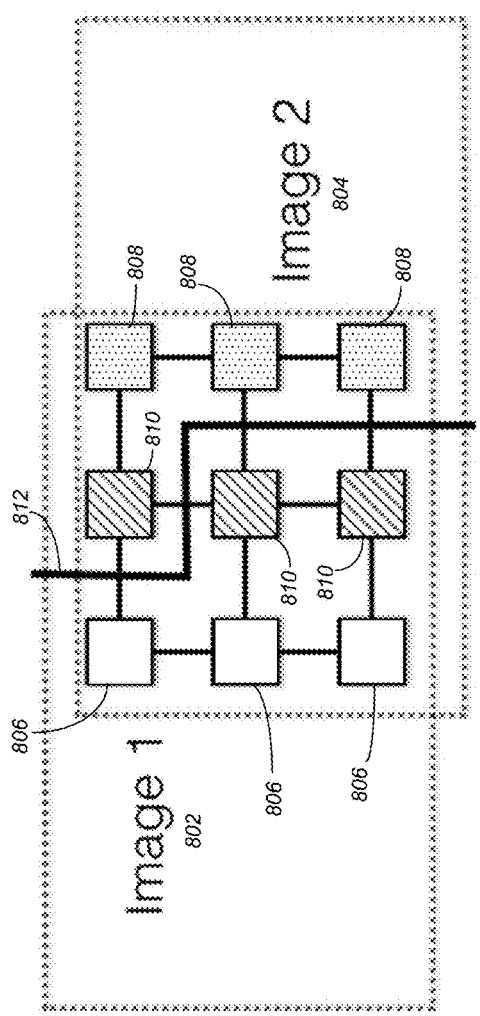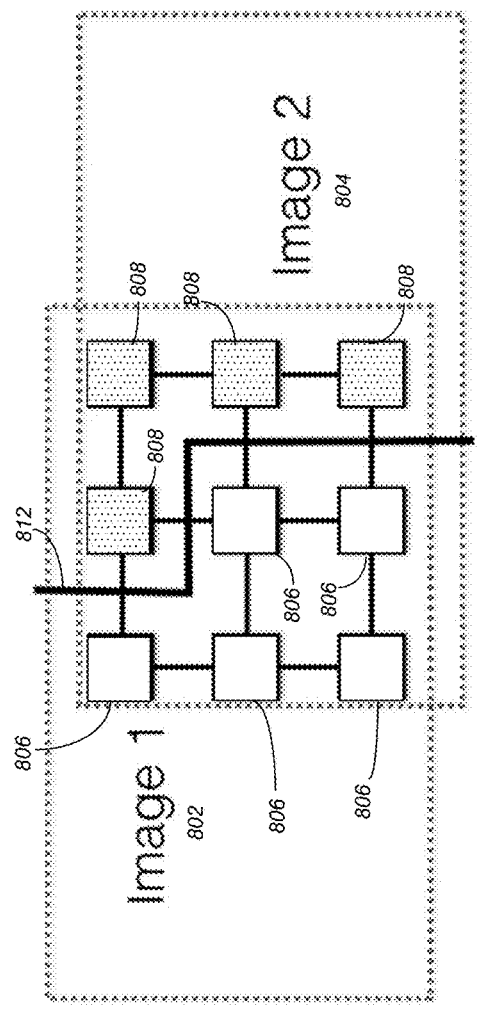

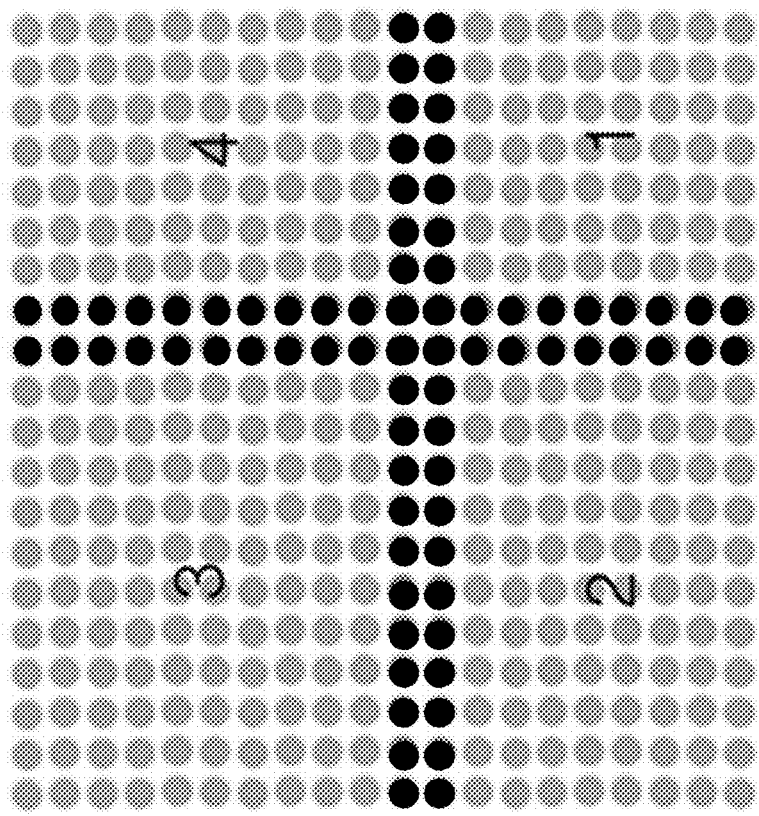
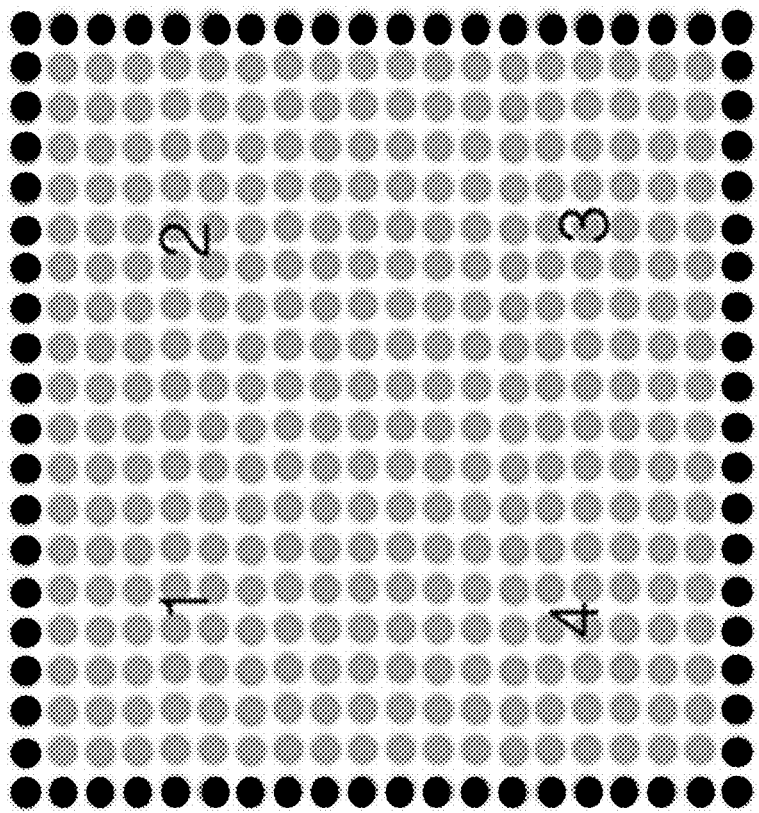
FIG. 10

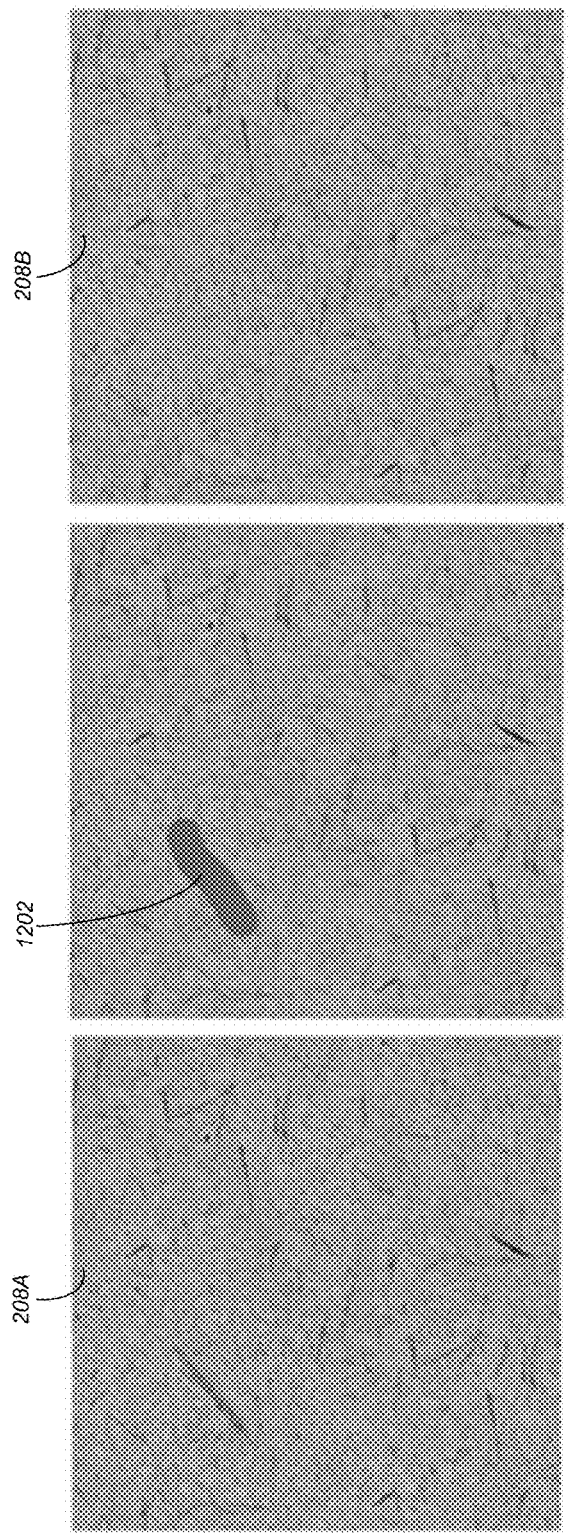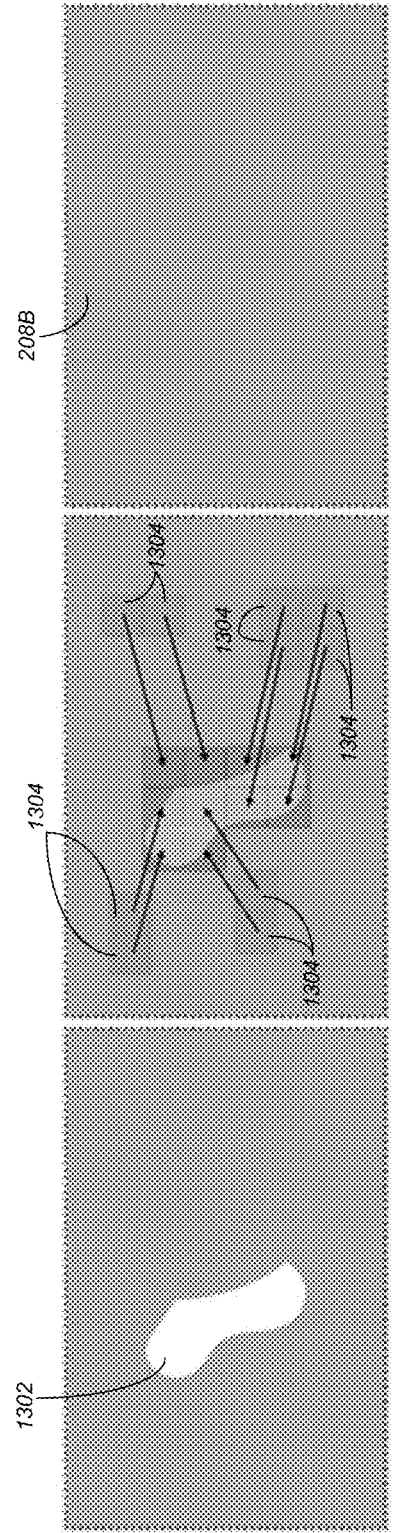

METHOD AND APPARATUS FOR A SEAMLESS TEXTURE UNIT GENERATOR

BACKGROUND OF THE INVENTION

1. Field of the Invention

The present invention relates generally to digital art design, and in particular, to a method, apparatus, system, and article of manufacture for designing and utilizing a texture unit so that no visible seams appear after tiling.

2. Description of the Related Art (Note: This application references a number of different publications as indicated throughout the specification by reference numbers enclosed in brackets, e.g., [x]. A list of these different publications ordered according to these reference numbers can be found below in the section entitled "References." Each of these publications is incorporated by reference herein.)

Tiling is a process to cover a large area by repeat laying out a texture unit (or tile). It is widely used in architecture and more recently applied in digital design industry.

Although manually drawing a perfect texture unit is possible for skilled artists, creating a texture unit can be difficult because arbitrary tiles do not guarantee boundary consistency, causing noticeable seams along the boundary of neighboring tiles. FIG. 1 illustrates a visual artifact with naïve tiling of the prior art. As illustrated, an arbitrary area 102 of a source image 100 is selected to use as a sample unit 104. The sample unit 104 is then repeated/tiled to create a tiled image 106. However, the tiled image 106 produces a noticeable seam 108.

In view of the above, what is needed is the ability to generate a texture unit that can be used for tiling without producing visible seams.

SUMMARY OF THE INVENTION

Texture tiling is used intensively in digital art design, providing a convincing look and feel of the surface detail. To achieve a visual pleasing result, a texture unit is carefully designed so that no visible seams appear after tiling. Unfortunately, designing seamless texture units is difficult requiring substantial manual work/efforts.

Embodiments of the invention provide a simple but effective approach to extract a seamless texture unit from arbitrary images. With the invention, a novice is able to generate a texture unit for seamless tiling in just a few easy steps. A texture sample is cut in a vertical and/or horizontal direction. Then, the cut parts are shuffled so that the boundary pixels are switched inside while inner pixels move to boundaries. A minimization process is solved to find the best mask for overlaying the original texture. The resulting merged texture can then be seamlessly tiled.

BRIEF DESCRIPTION OF THE DRAWINGS

Referring now to the drawings in which like reference numbers represent corresponding parts throughout:

FIG. 6 illustrates overlaying pixels to remove seams in accordance with one or more embodiments of the invention;

FIGS. 7A-7D illustrate the mask computation in accordance with one or more embodiments of the invention;

FIGS. 8A-8B illustrate a method used to generate a graph cut line in accordance with one or more embodiments of the invention;

FIG. 10 illustrates non-centered shuffling in accordance with one or more embodiments of the invention;

FIGS. 12A-12C illustrate heal brush post processing in accordance with one or more embodiments of the invention;

FIGS. 13A-13C illustrates further details of the heal brush post processing in accordance with one or more embodiments of the invention;

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention provide an interactive texture unit design method and system that supports real-time performance. In addition, optional pre- and post-processing further optimize the quality of the resultant texture unit.

Figure 1:
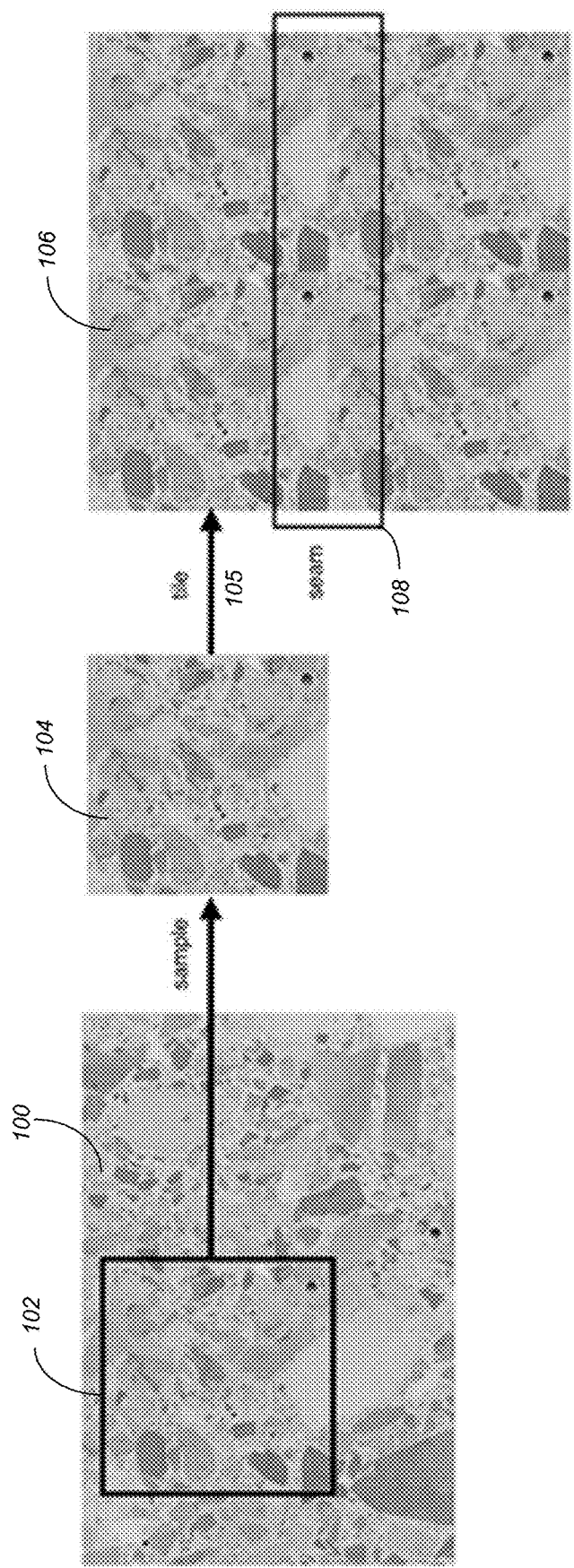
FIG. 1 illustrates a visual artifact with naïve tiling of the prior art.
Figure 2:
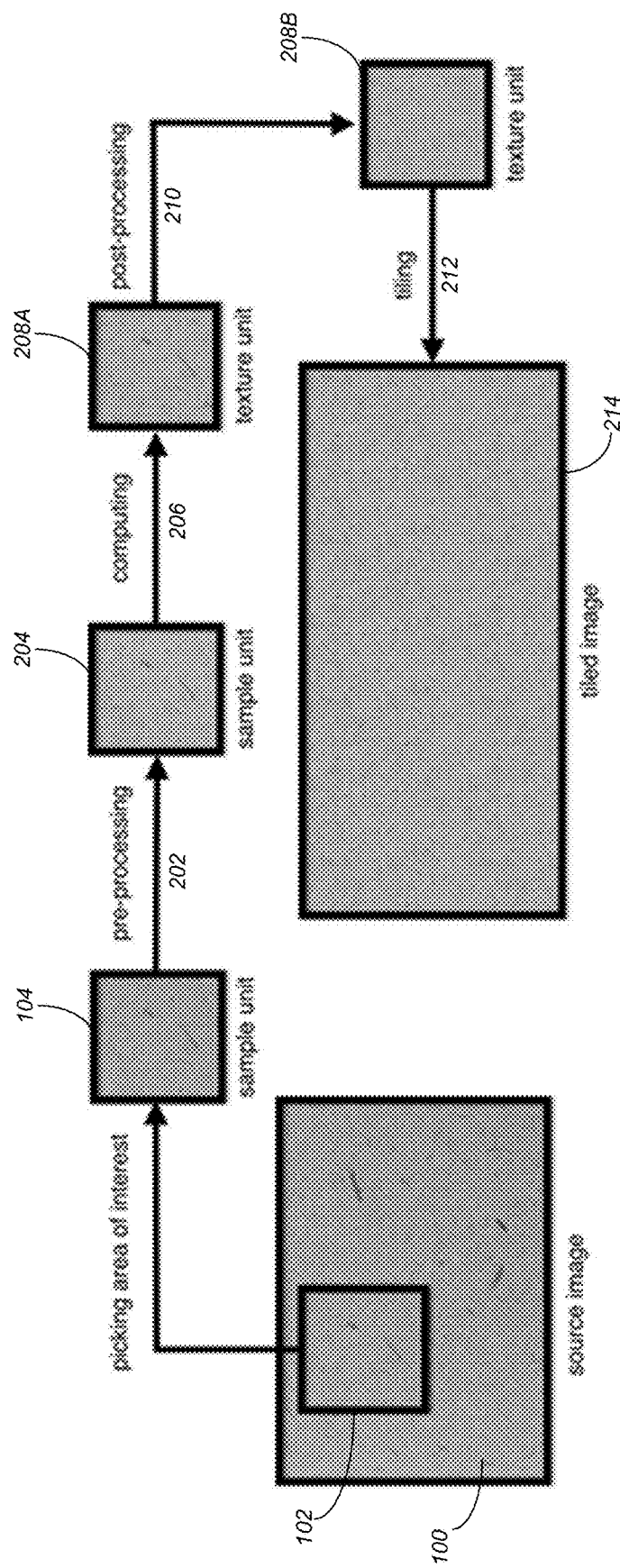
FIG. 2 illustrates a typical workflow for generating and utilizing a texture unit to produce a tiled image in accordance with one or more embodiments of the invention.

FIG. 2 illustrates a typical workflow for generating and utilizing a texture unit to produce a tiled image in accordance with one or more embodiments of the invention. An area of interest 102 is selected/picked from the source image 100 to utilize as the sample unit 104. Pre-processing 202 may be performed on the sample unit 104 to produce an updated sample unit 204. Computing 206 is then performed on the updated sample unit 204 to produce the texture unit 208A. Post-processing 210 to further optimize the quality may be performed on the texture unit 208A to produce an updated texture unit 208B. The texture unit 208 (the computed texture unit 208A and post-processed texture unit 208B are collectively referred to herein as texture unit 208) is then tiled 212 to produce the tiled image 214.

Terminology

For clearness, definitions for the following terminology are provided:
  Source image 100: the input image where the texture unit will be extracted from.
  Sample unit 104: a small part of the source image 100 where the texture is of interest.
  Texture unit 208: a unit produced by embodiments of the invention, also referred to as a tile.
  Naïve tiling: the tiling process 105 utilizing the sample unit 104 of the prior art.
  Seamless tiling: the tiling process 212 utilizing the texture unit 208 in accordance with one or more embodiments of the invention.

Detailed Workflow

Pre-Processing (Optional)

Step 202 provides for the optional step of pre-processing the sample unit 104. Considering a user can pick an arbitrary region 102 from the source image 100 as the sample unit 104, a problem might arise due to an inconsistent lighting gradient that often appears in natural images.

Figure 3:
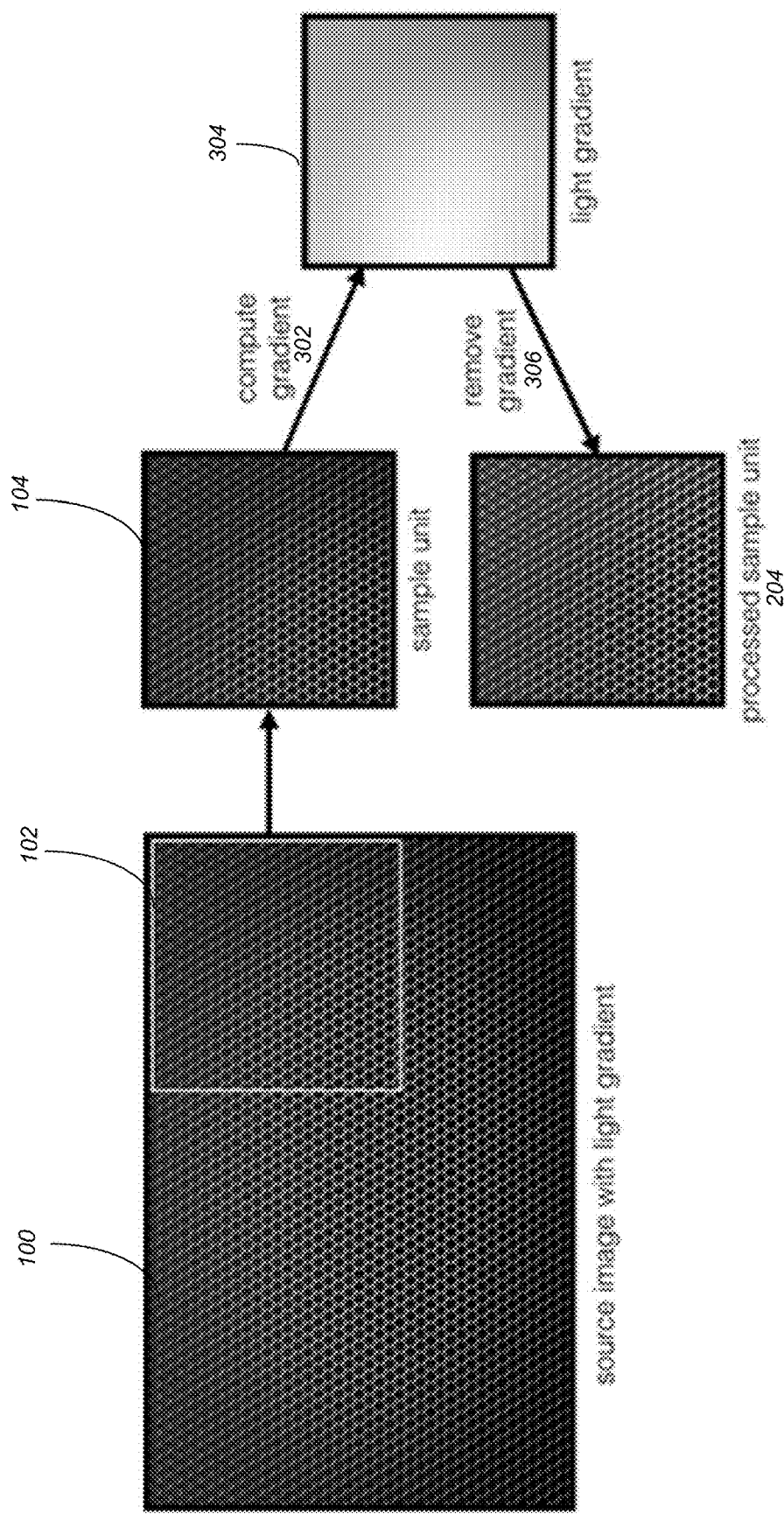
FIG. 3 illustrates an exemplary pre-processing step utilized in accordance with one or more embodiments of the invention.

FIG. 3 illustrates an exemplary pre-processing step utilized in accordance with one or more embodiments of the invention.

The source image 100 has a strong spot light gradient, caused by lighting conditions during photo capturing. Therefore, one can clearly notice the light change from center to corners. The sample unit 104 being picked near the top-right corner will inevitably have light gradient too, causing visible inconsistency in tiling.

Embodiments of the invention extract and remove light gradient to solve this problem. To compute 302 the light gradient 304, the luminance channel is extracted 302 from the sample unit 104. Gaussian smoothing is applied to it with a kernel as large as the sample unit's own size, generating an approximate light gradient image 304. To remove the gradient 306, the pixel values in the light gradient image 304 are linearly scaled to [thresh, 255] where thresh is a user tunable parameter. Finally, a new value of each pixel in the sample unit 104 is computed. The new value is generated by dividing the pixel's old value (i.e., from the sample unit 104) by its corresponding value in the light gradient image 304.

As illustrated in FIG. 3, the processed sample unit 204 is more consistent in color than the original sample unit.

Computing

Figure 4:
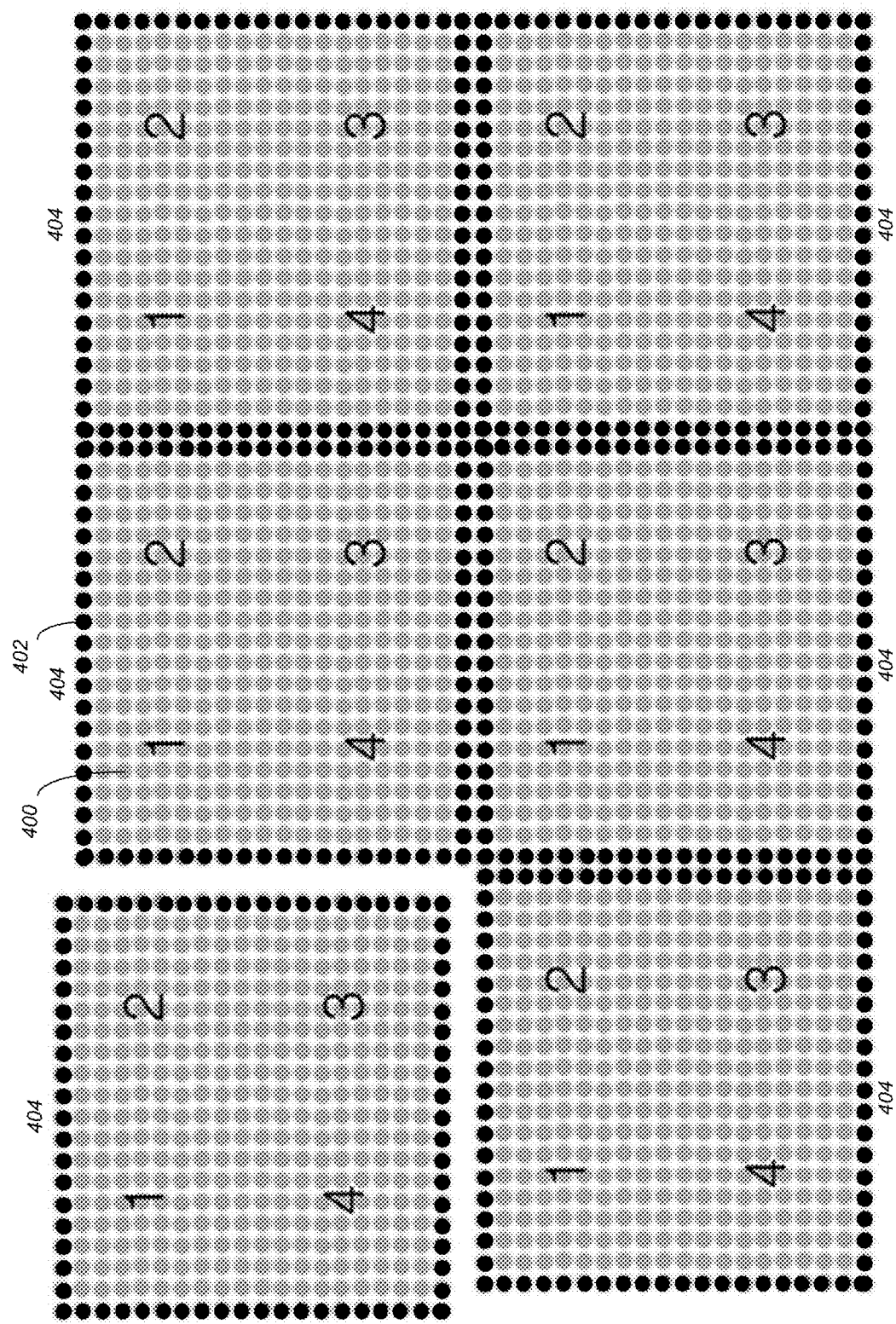
FIG. 4 illustrates seams generated using naïve tailing of the prior art.

As described above, seams may exist in the naïve tiling of the prior art. FIG. 4 illustrates seams generated using naïve tailing of the prior art. Each of the dots 400-402 represent pixels in the sample unit 102. Notice the dark dots 402 are not continuous across neighboring tiles 404. Dots 402 eventually generate visible seams in the result.

Figure 5:
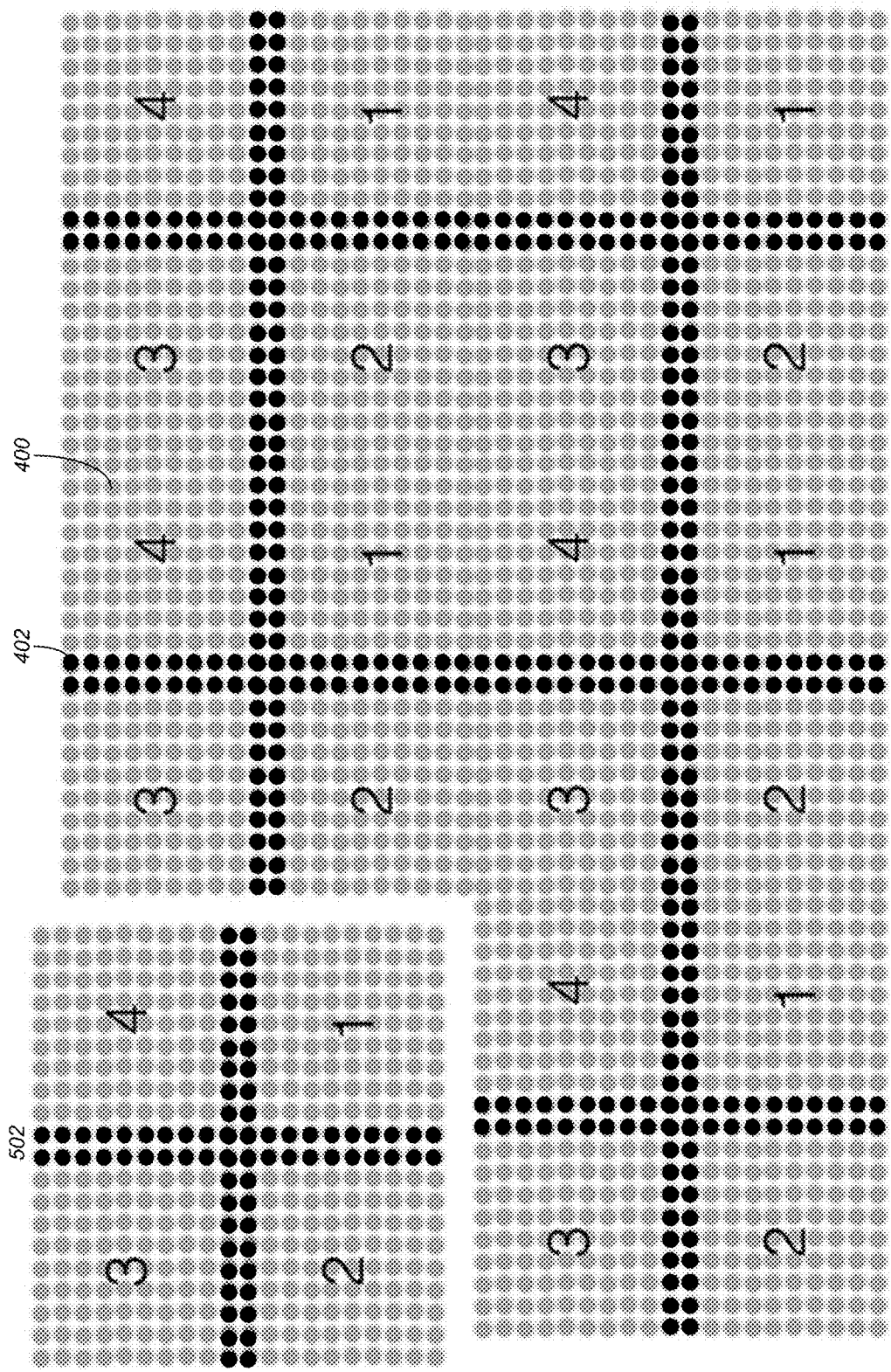
FIG. 5 illustrates a shuffling that moves seams to the inner part in accordance with one or more embodiments of the invention.

To remove the seams (dots 402), a shuffle-and-overlay strategy is used. FIG. 5 illustrates a shuffling that moves seams to the inner part in accordance with one or more embodiments of the invention. The sample unit 102 is first split into one horizontal cut and/or one vertical cut. Then, each part (i.e., parts 1, 2, 3, and 4) is moved to its center-symmetric position, generating a shuffled sample unit 502 (i.e., part 1 is moved from the upper left in FIG. 4 to the lower right in FIG. 5; part 2 is moved from the upper right in FIG. 4 to the lower left in FIG. 5, etc.). In this way, the non-continuous borders (dots 402) move to the center of the image, forming the 'cross' shape; and the continuous pixels 400 move to the borders.

The next step in the process is to remove the "cross" shape/seams from the shuffled sample unit 502 via overlaying. FIG. 6 illustrates overlaying pixels to remove seams in accordance with one or more embodiments of the invention. To remove the 'cross' in the center of the shuffled sample unit 502, dots 602 are picked from the original sample unit 104, and the picked dots 602 are overlaid on top of the corresponding dots in the shuffled sample unit 502. Accordingly, dots 402 are not seen anymore in the resulting texture unit 208.

Although dots 402 were successfully removed, the area 602 of overlaying dots (also referred to as a "mask") must be carefully computed so that no new seams are generated. In one or more embodiments of the invention, the mask 602 may be computed based on a Graphcut Textures [2] technique. FIGS. 7A-7D illustrate the mask computation in accordance with one or more embodiments of the invention. Two constraints must be met:

(1) Pixels from the boundary must come from the shuffled sample unit 502, shown as dots 702 in FIG. 7A. This guarantees consistency when tiling.

(2) Pixels on the 'cross' in the center must come from sample unit 104, shown as dots 402 in FIG. 7A. To ensure that pixels on the 'cross' come from the sample unit 104, an arbitrary shape/mask may be used. As illustrated in FIG. 7B, a diamond-shaped initial mask 704 may be used.

The gray dots 400 in FIG. 7A represent the unknown pixels to be determined. Embodiments of the invention take the original sample unit 104 and shuffled sample unit 502 as input, and outputs an optimized cut line 706 wherein neighboring pixels separated by the cut line 706 have the closest colors (as illustrated in FIG. 7C).

Once the boundary/cut line 706 is found, the final mask is generated as illustrated in FIG. 7D (e.g., all of the pixels within the boundary/cut line 706 are taken from the shuffled sample unit 502, and the pixels outside of the boundary/cut line 706 are taken from the original sample unit 104).

To compute the optimized cut line 706, colors of neighboring pixels are compared (e.g., the color vector distance). FIGS. 8A-8B illustrate a method used to generate the graph cut line 706 in accordance with one or more embodiments of the invention. Referring to FIG. 8A, suppose one wants to generate a new image from two overlapping images (Image 1 802 and Image 2 804). Each pixel is either from Image 1

802 or Image 2 804. Further suppose that some pixels definitely belong to Image 1 802 (i.e., pixels 806), some other pixels definitely belong to Image 2 804 (i.e., pixels 808), and then one can decide the unknown pixels (i.e., pixels 810), by computing a cut 812 through the neighboring pixels, such that neighboring pixels are closest in colors.

Once the cut 812 is computed, one can see that each unknown pixel 810 either come from Image 1 802 or Image 2 804 (e.g., as illustrated in FIG. 8B).

Figure 9:
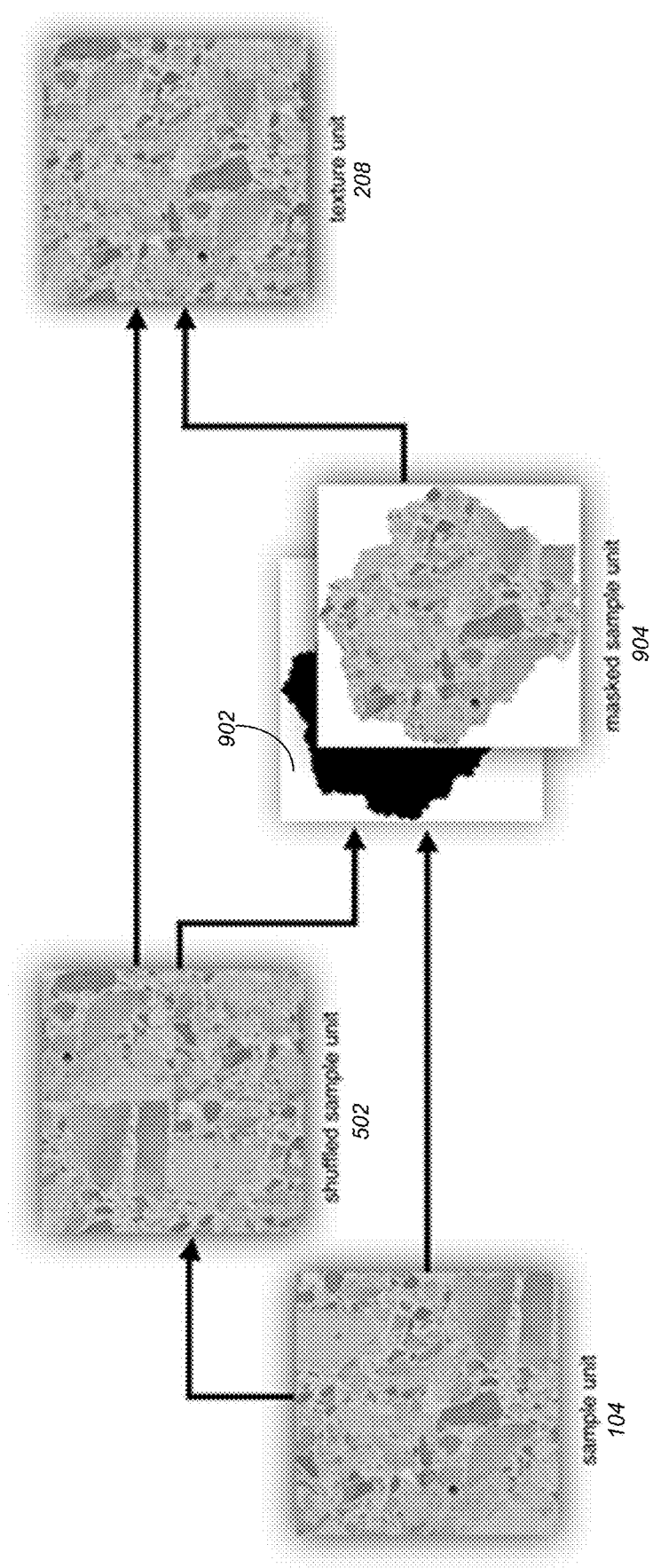
FIG. 9 illustrates the overall steps to generate a texture unit in accordance with one or more embodiments of the invention.

In summary, FIG. 9 illustrates the overall steps to generate a texture unit in accordance with one or more embodiments of the invention. First, the sample unit 104 is shuffled to create the shuffled sample unit 502. Next, an optimized mask 902 is computed in which masked pixels belong to the sample unit 104 and unmasked pixels belong to the shuffled sample unit 502. Finally, the masked sample unit 904 is overlaid over the shuffled sample unit 502 to create the texture unit 208.

Variations

Adjusting the content of the generated texture 208 is possible by two approaches. First, when the shuffling is performed, the horizontal and vertical cuts don't have to go through the center of the sample unit 104. By not centering the cuts, pixels near the cut are more likely to be preserved in the final result. FIG. 10 illustrates non-centered shuffling in accordance with one or more embodiments of the invention. As illustrated, the vertical and horizontal cuts are shifted to make part 1 smaller vertically and horizontally, part 2 larger horizontally but smaller vertically, part 3 larger both horizontally and vertically, and part 4 smaller horizontally but larger vertically.

Figure 11B:
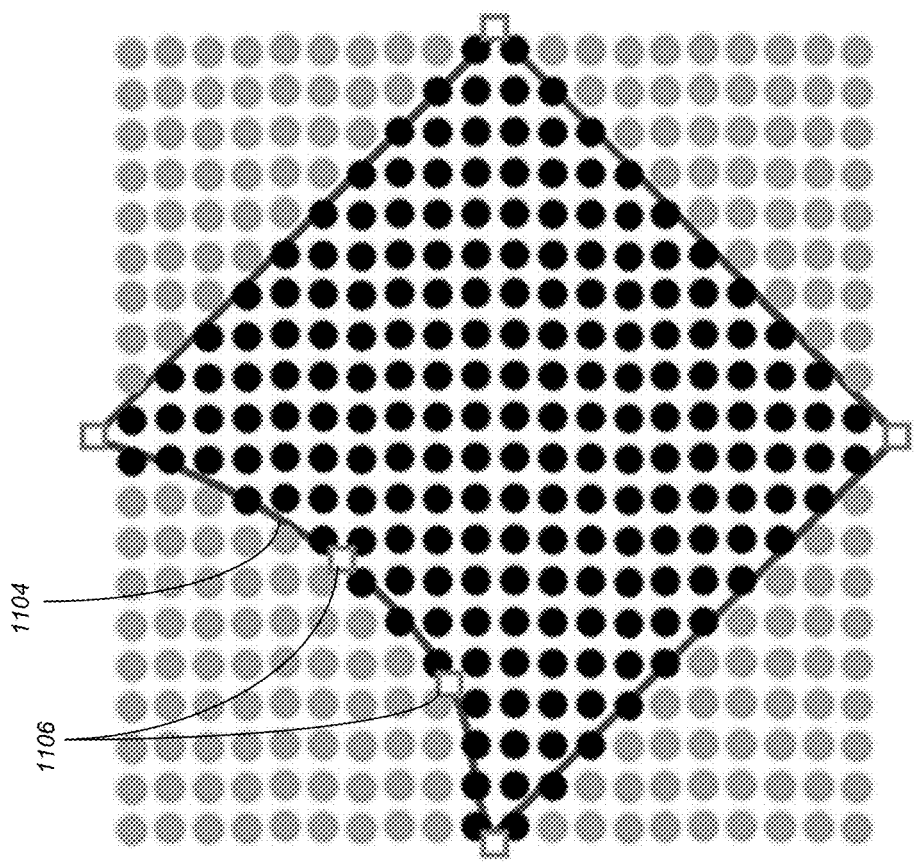
FIGS. 11A and 11B illustrate an initial mask editing with a Bezier curve tool in accordance with one or more embodiments of the invention.
Figure 11A:
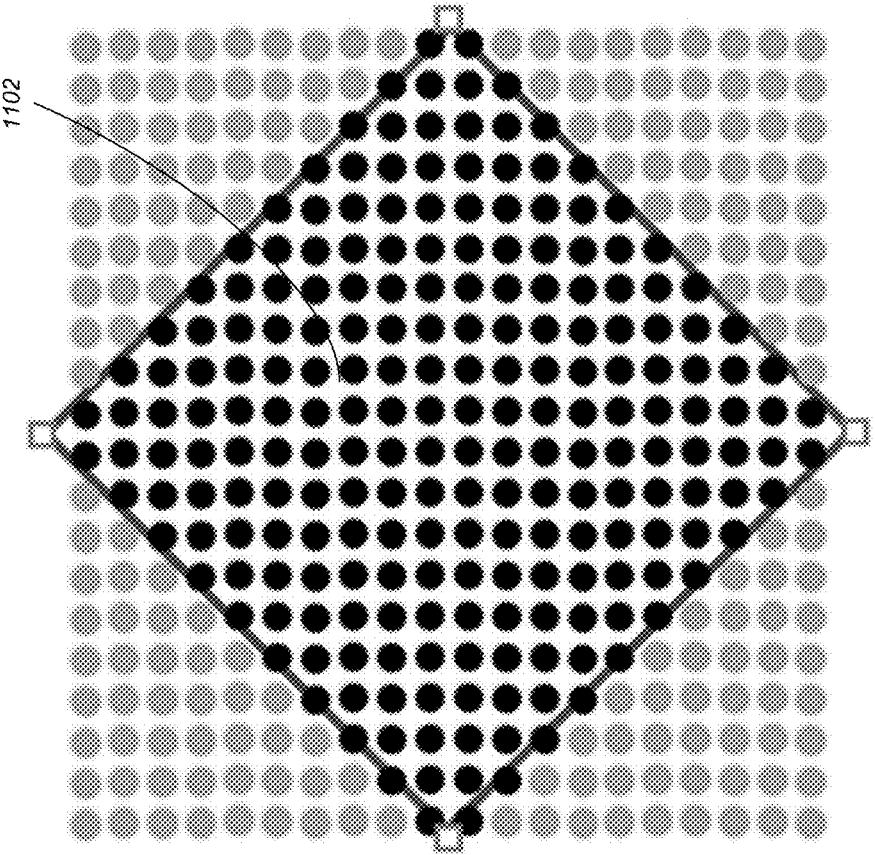

Secondly, the initial mask 704 does not have to be diamond-shaped. In practice, a Bezier curve tool may be provided along the diamond shape, so that a user can adjust the shape of the initial mask 704. Such a tool allows users to include/exclude pixels from the computing. FIGS. 11A and 11B illustrate an initial mask editing with a Bezier curve tool in accordance with one or more embodiments of the invention. FIG. 11A illustrates an initial diamond shaped mask 1102. In FIG. 11B, the user has used a Bezier curve tool to edit edge 1104 of the diamond shape 1102 (e.g., by adding/modifying/moving points 1106).

Post-Processing (Optional)

Once the texture unit 208 is computed/generated, further inside touch-up may be performed to provide a more customized result. In one or more embodiments of the invention, a heal brush may be used to remove unwanted small-scale detail(s). One exemplary heal brush implementation may be based on PATCHMATCH technology [3], which tries to fill an unknown area with pixels nearby. For example, if a part of an image is missing, a heal brush may attempt to compute the missing pixels based on nearby neighboring pixels, so that the missing part can be "healed".

FIGS. 12A-12C illustrate heal brush post processing in accordance with one or more embodiments of the invention. FIG. 12A illustrates the texture unit 208A. A user utilizes a heal brush to indicate the area with a detail to be removed. FIG. 12B illustrates a visual indicator that reflects the area 1202 the user has marked with the heal brush. The marked area 1202 is treated as an unknown area and nearby pixels are used to fill that area. The resulting texture unit 208B is illustrated in FIG. 12C.

FIGS. 13A-13C illustrates further details of the heal brush post processing in accordance with one or more embodiments of the invention. FIG. 13A illustrates the unknown area 1302 that is to be filled (e.g., that is marked via a heal brush). FIG. 13B illustrates that neighboring pixels 1304 are used to fill in the marked area 1302. FIG. 13C illustrates the resulting image/texture unit 208B once the unknown area 1302 is filled with neighboring pixels 1304.

Such a post-processing workflow may be practical as it helps the user remove small details that might cause visual artifacts. Other options such as Poisson editing [1] can also be applied to remove small details. Embodiments of the invention may also utilize different techniques depending on the texture (e.g., one technique for structural textures and another technique for non-structural textures).

Results

Various tiling results that use different source images are described below. For comparison purposes, the naïve tiling of the prior art is shown first, followed by the tiling (e.g., of the invention) with the same sample unit is shown.

Figure 14:
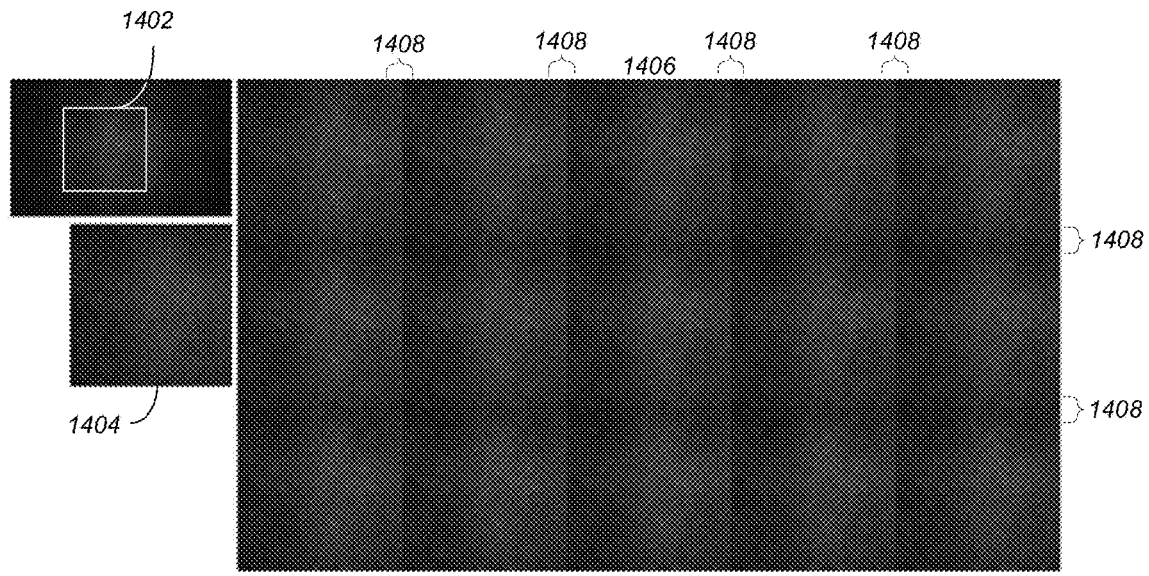
FIG. 14 illustrates an ironing board source image with naïve tiling of the prior art.

FIG. 14 illustrates an ironing board source image with naïve tiling of the prior art. Area 1402 is selected from the source image to use as the sample/tile 1404. Resulting image 1406 illustrates the naïve tiling that results from using tile 1404. One may note that numerous seams 1408 are visually discernable.

Figure 15:
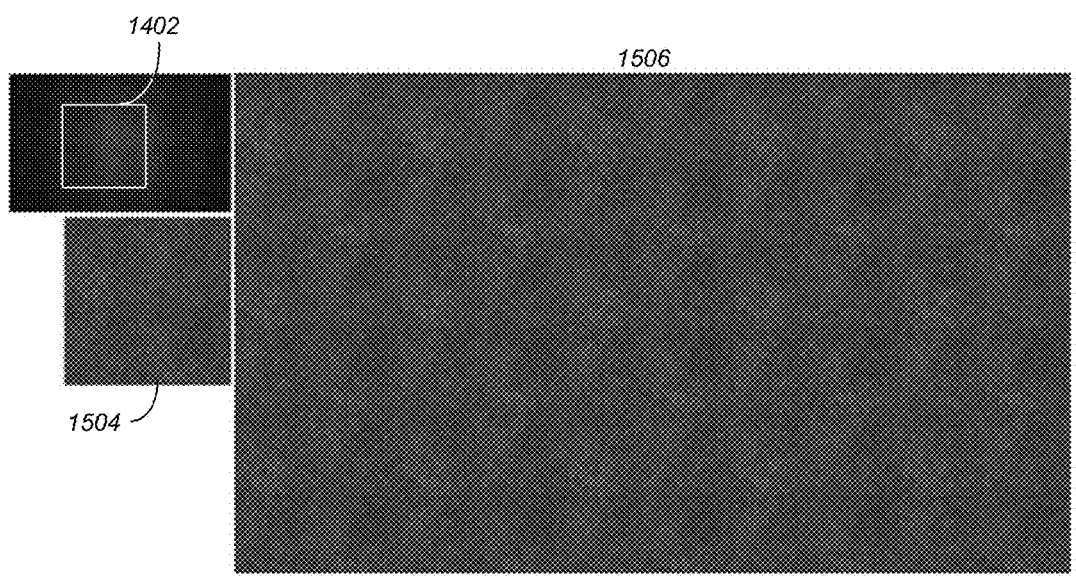
FIG. 15 illustrates the ironing board source image of FIG. 14 with seamless tiling in accordance with one or more embodiments of the invention.

FIG. 15 illustrates the ironing board source image of FIG. 14 with seamless tiling in accordance with one or more embodiments of the invention. Area 1402 is selected from the source image. However, the processing described herein is used to create the texture unit 1504 that is used to produce the tiled resulting image 1506 that does not have visually discernable seams.

Figure 16:
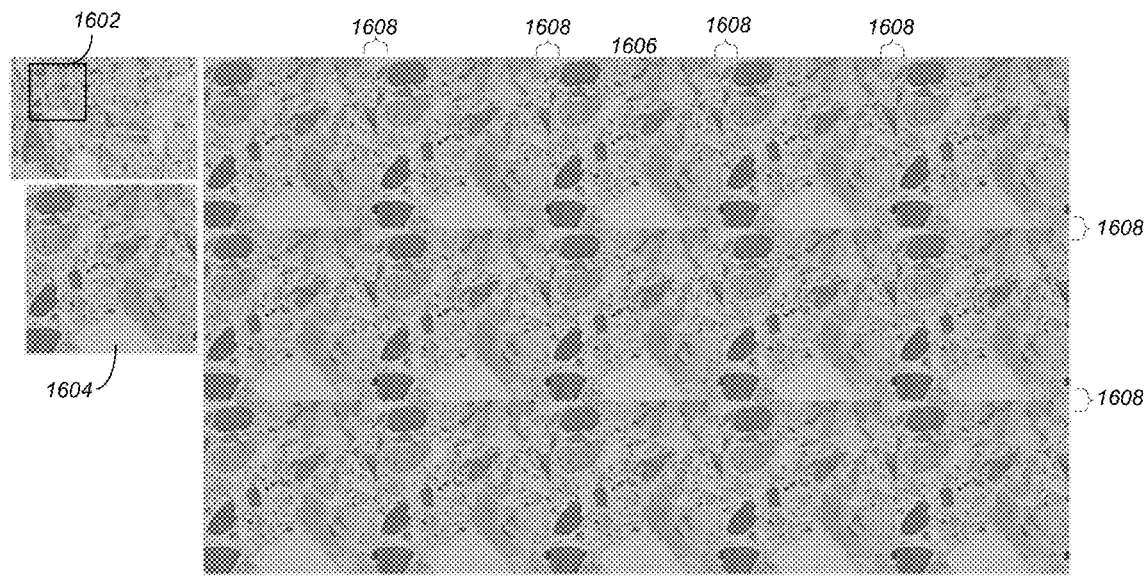
FIG. 16 illustrates a stone source image with naïve tiling of the prior art.

FIG. 16 illustrates a stone source image with naïve tiling of the prior art. Area 1602 is selected from the source image to be used as the sample/tile 1604. Resulting image 1606 illustrates the naïve tiling that results from using tile 1604. One may note that numerous seams 1608 are visually discernable.

Figure 17:
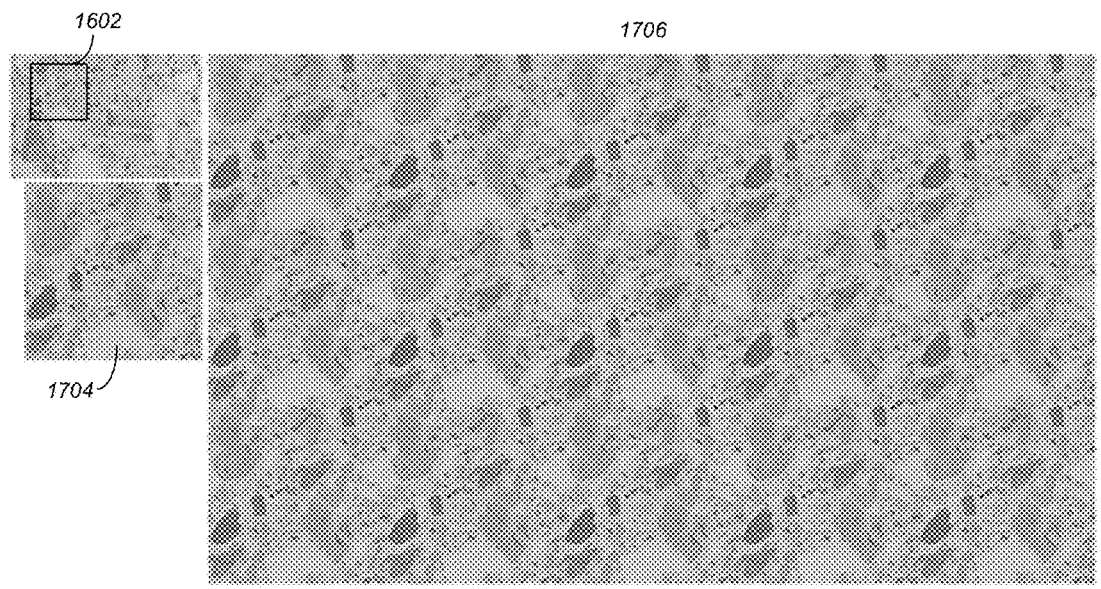
FIG. 17 illustrates the stone source image of FIG. 16 with seamless tiling in accordance with one or more embodiments of the invention.

FIG. 17 illustrates the stone source image of FIG. 16 with seamless tiling in accordance with one or more embodiments of the invention. Area 1602 is selected from the source image. However, the processing described herein is used to create the texture unit 1704 that is used to produce the tiled resulting image 1706 that does not have visually discernable seams.

Figure 18:
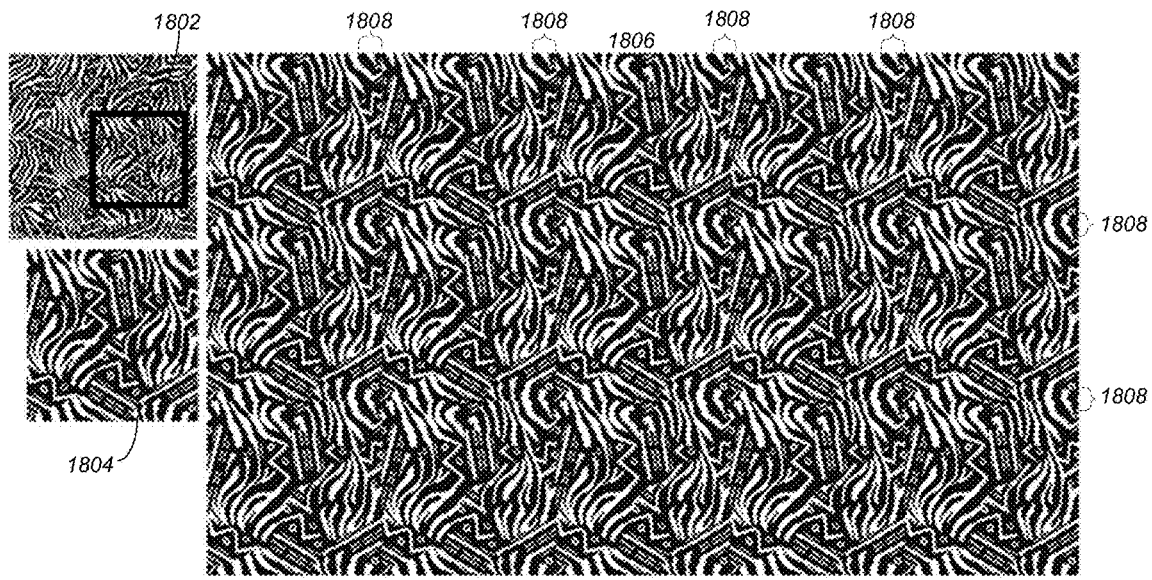
FIG. 18 illustrates a drawing source image with naïve tiling of the prior art.

FIG. 18 illustrates a drawing source image with naïve tiling of the prior art. Area 1802 is selected from the source image to be used as the sample/tile 1804. Resulting image 1806 illustrates the naïve tiling that results from using tile 1804. One may note that numerous seams 1808 are visually discernable.

Figure 19:
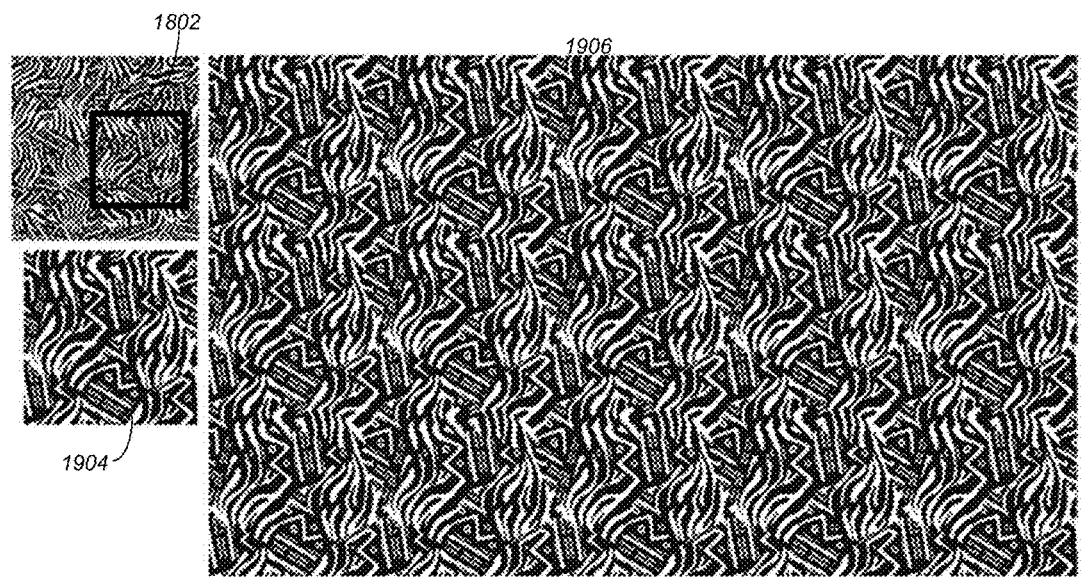
FIG. 19 illustrates the drawing source image of FIG. 18 with seamless tiling in accordance with one or more embodiments of the invention.

FIG. 19 illustrates the drawing source image of FIG. 18 with seamless tiling in accordance with one or more embodiments of the invention. Area 1802 is selected from the source image. However, the processing described herein is used to create the texture unit 1904 that is used to produce the tiled resulting image 1906 that does not have visually discernable seams.

Figure 20:
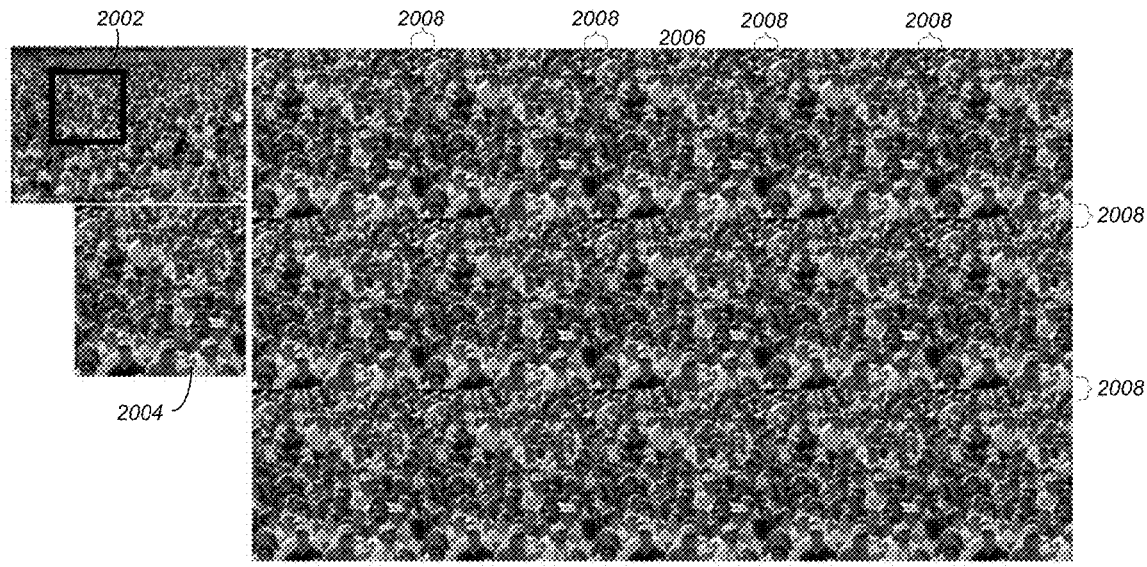
FIG. 20 illustrates a crowd source image with naïve tiling of the prior art.

FIG. 20 illustrates a crowd source image with naïve tiling of the prior art.

Area 2002 is selected from the source image to be used as the sample/tile 2004. Resulting image 2006 illustrates the naïve tiling that results from using tile 2004. One may note that numerous seams 2008 are visually discernable.

Figure 21:
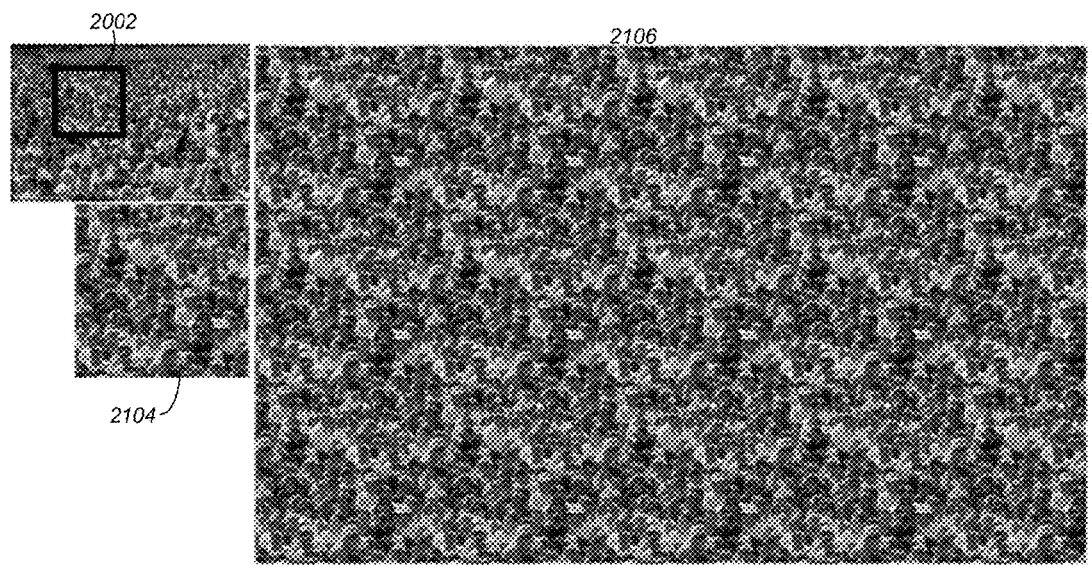
FIG. 21 illustrates the crowd source image of FIG. 20 with seamless tiling in accordance with one or more embodiments of the invention.

FIG. 21 illustrates the crowd source image of FIG. 20 with seamless tiling in accordance with one or more embodiments of the invention. Area 2002 is selected from the source image. However, the processing described herein is used to create the texture unit 2104 that is used to produce the tiled resulting image 2106 that does not have visually discernable seams.

Figure 22:
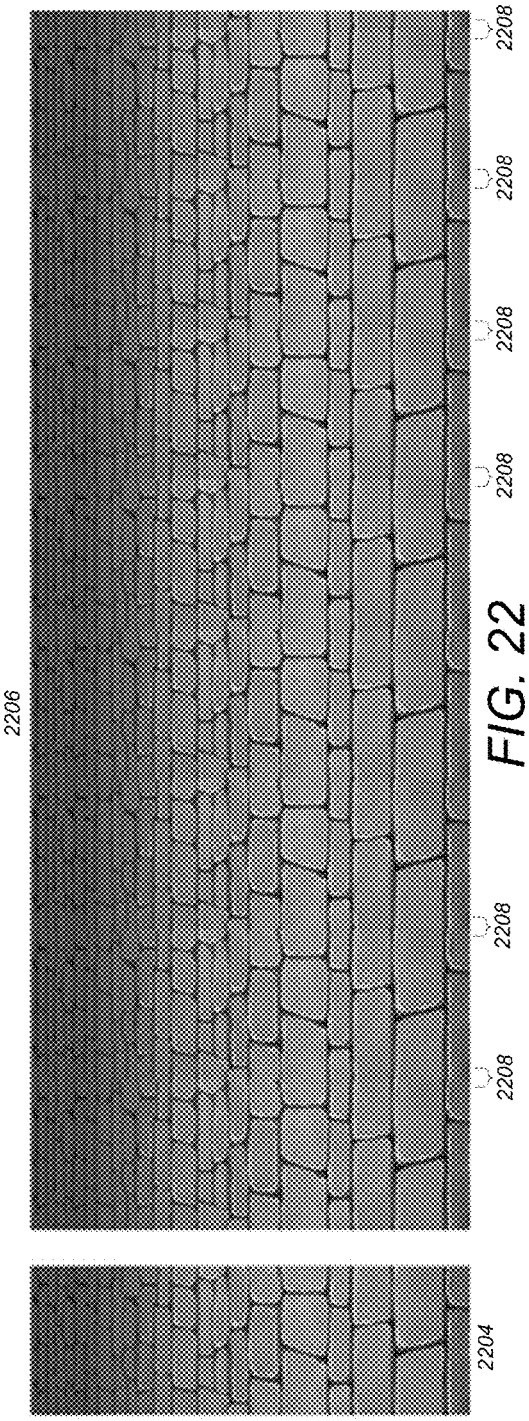
FIG. 22 illustrates a wall source image with naïve tiling of the prior art.

One-way tiling is also straightforward with embodiments of the invention. FIG. 22 illustrates a wall source image with naïve tiling of the prior art. As illustrated, area 2204 has been selected for use as the sample/tile (the sample 2204 extends the length of the image from top-to-bottom but and is a slice taken vertically. With the naïve tiling, visible seams 2208 are visually discernable in the resulting image 2206.

Figure 23:
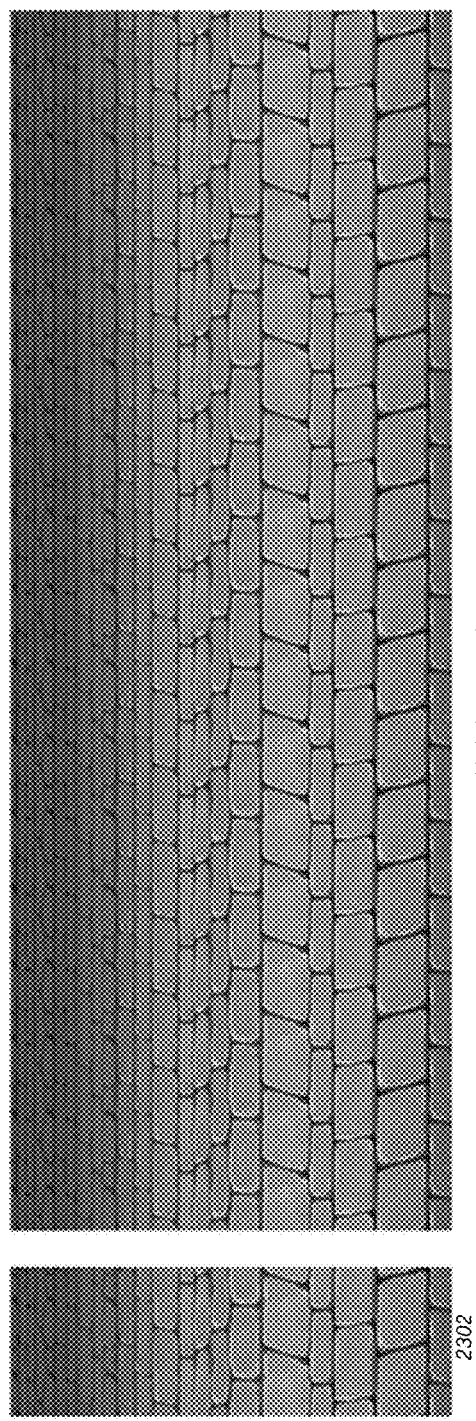
FIG. 23 illustrates a wall source image with seamless tiling in accordance with one or more embodiments of the invention.

FIG. 23 illustrates a wall source image with seamless tiling in accordance with one or more embodiments of the invention. The same vertical slice 2204 is selected for use as the tile. However, the processing of embodiments of the invention are used use to process slice 2204 to create tile 2302 that is used to produce the tiled resulting image 2306 that does not have visually discernable seams.

Logical Flow

Figure 24:
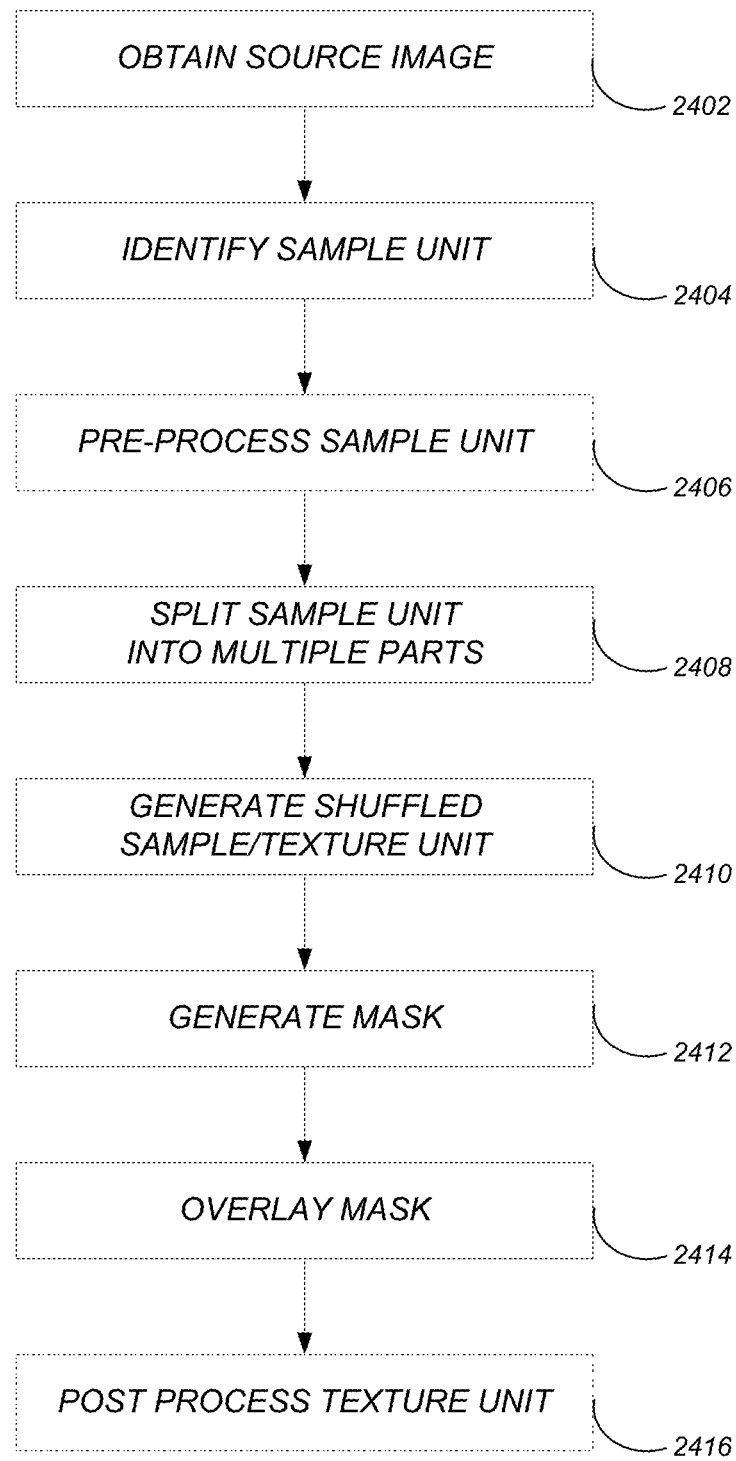
FIG. 24 illustrates the logical flow for generating a texture unit for seamless tiling.

FIG. 24 illustrates the logical flow for generating a texture unit for seamless tiling.

A step 2402, a source image is obtained.

At step 2404, a sample unit is identified. The sample unit consists of a part of the source image where texture is of interest. Further, the sample unit consists of multiple pixels including non-continuous border pixels and continuous pixels.

At optional step 2406, the sample unit is pre-processed. Such pre-processing may include extracting a luminance channel from the sample unit, computing a light gradient image of the sample unit based on the luminance channel, and computing a new value of each of the multiple pixels in the sample unit based on the light gradient image. To compute the light-gradient image, Gaussian smoothing may be applied to the luminance channel with a kernel size as large as a size of the sample unit to generate an approximate light gradient image. Thereafter, pixel values may be linearly scaled in the approximate light gradient image using a user tunable parameter to generate the light gradient image. Further, the new value of each of the multiple pixels may include dividing, for each of the multiple pixels, an old pixel value in the sample unit by a corresponding value in the light gradient image.

At step 2408, the sample unit is split into multiple parts using a horizontal cut and/or a vertical cut.

At step 2410, a shuffled sample unit is generated by moving each of the multiple parts into a center-symmetric position based on the horizontal cut and/or the vertical cut. The non-continuous border pixels of each of the multiple parts move to a center of the shuffled sample unit. Further, the continuous pixels of each of the multiple parts move to borders of the shuffled sample unit.

At step 2412, a mask is generated by selecting one or more of the multiple pixels from the sample unit. To generate the mask, the sample unit is used as a first input, and the shuffled sample unit is used as a second input. Based on the two inputs, the mask is output. Further, an initial mask includes one or more border pixels from the shuffled sample unit, one or more center pixels (that cover an area that may be diamond shaped) from the sample unit, and one or more unknown pixels to be determined. A Bezier curve tool may be provided (along the area) that accepts user input to adjust a shape of the initial mask. In addition, the one or more border pixels are located on a border of the shuffled sample unit, and the one or more center pixels are from the sample unit and cover an area that corresponds to the non-continuous border pixels of the shuffled sample unit. Also, a cut line in the initial mask separates neighboring pixels. This cut line determines if the one or more unknown pixels are from the sample unit or from the shuffled sample unit. As described above, the cut line is based on a measure of color difference between pairs of neighboring pixels, and neighboring pixels closest in color determine whether an unknown pixel is from the sample unit or the shuffled sample unit. The mask that is output is determined from the initial mask and the cut line.

At step 2414, the mask is overlaid on top of corresponding pixels in the shuffled sample unit to generate the texture unit.

Optional post processing 2416 may be performed on the texture unit. For example, an area of the texture unit may be selected and then filled in based on nearby pixels. Such a filling in of the area removes details in the texture unit that might cause visual artifacts.

In addition, the texture unit may then be used to generate a tiled image by repeatedly utilizing the texture unit as a tile.

Hardware Description

Figure 25:
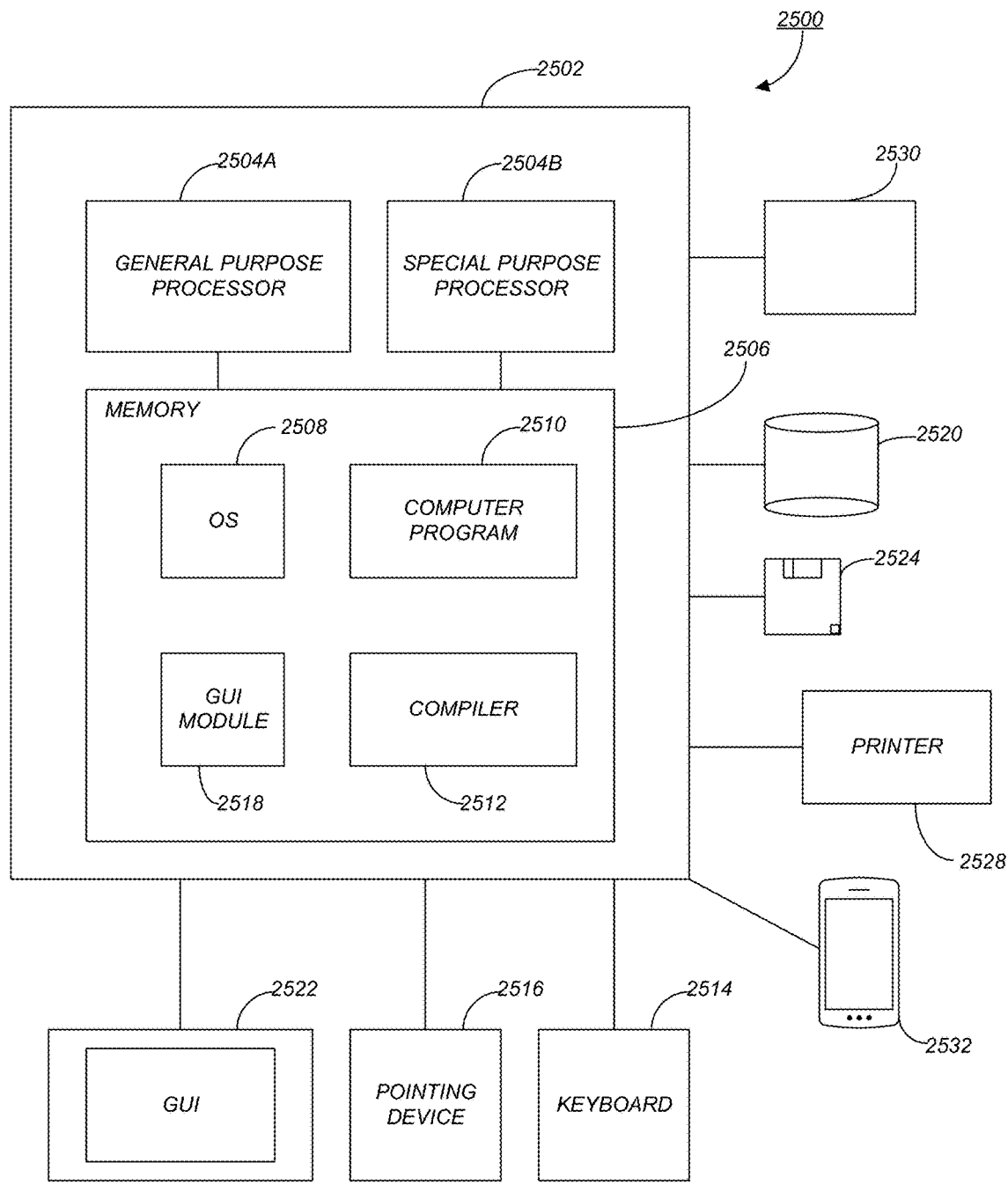
FIG. 25 is an exemplary hardware and software environment used to implement one or more embodiments of the invention.

FIG. 25 is an exemplary hardware and software environment 2500 used to implement one or more embodiments of the invention. The hardware and software environment includes a computer 2502 and may include peripherals. Computer 2502 may be a user/client computer, server computer, or may be a database computer. The computer 2502 comprises a general purpose hardware processor 2504A and/or a special purpose hardware processor 2504B (hereinafter alternatively collectively referred to as processor 2504) and a memory 2506, such as random access memory (RAM). The computer 2502 may be coupled to, and/or integrated with, other devices, including input/output (I/O) devices such as a keyboard 2514, a cursor control device 2516 (e.g., a mouse, a pointing device, pen and tablet, touch screen, multi-touch device, etc.) and a printer 2528. In one or more embodiments, computer 2502 may be coupled to, or may comprise, a portable or media viewing/listening device 2532 (e.g., an MP3 player, IPOD, NOOK, portable digital video player, cellular device, personal digital assistant, etc.). In yet another embodiment, the computer 2502 may comprise a multi-touch device, mobile phone, gaming system, internet enabled television, television set top box, or other internet enabled device executing on various platforms and operating systems.

In one embodiment, the computer 2502 operates by the general purpose processor 2504A performing instructions defined by the computer program 2510 under control of an operating system 2508. The computer program 2510 and/or the operating system 2508 may be stored in the memory 2506 and may interface with the user and/or other devices to accept input and commands and, based on such input and commands and the instructions defined by the computer program 2510 and operating system 2508, to provide output and results.

Output/results may be presented on the display 2522 or provided to another device for presentation or further processing or action. In one embodiment, the display 2522 comprises a liquid crystal display (LCD) having a plurality of separately addressable liquid crystals. Alternatively, the display 2522 may comprise a light emitting diode (LED) display having clusters of red, green and blue diodes driven together to form full-color pixels. Each liquid crystal or pixel of the display 2522 changes to an opaque or translucent state to form a part of the image on the display in response to the data or information generated by the processor 2504 from the application of the instructions of the computer program 2510 and/or operating system 2508 to the input and commands. The image may be provided through a graphical user interface (GUI) module 2518. Although the GUI module 2518 is depicted as a separate module, the instructions performing the GUI functions can be resident or distributed in the operating system 2508, the computer program 2510, or implemented with special purpose memory and processors.

In one or more embodiments, the display 2522 is integrated with/into the computer 2502 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD), portable/handheld game/music/video player/console devices (e.g., IPOD TOUCH, MP3 players, NINTENDO 3DS, PLAYSTATION PORTABLE, etc.), touch tables, and walls (e.g., where an image is projected through acrylic and/or glass, and the image is then backlit with LEDs).

Some or all of the operations performed by the computer 2502 according to the computer program 2510 instructions may be implemented in a special purpose processor 2504B. In this embodiment, the some or all of the computer program 2510 instructions may be implemented via firmware instructions stored in a read only memory (ROM), a programmable read only memory (PROM) or flash memory within the special purpose processor 2504B or in memory 2506. The special purpose processor 2504B may also be hardwired through circuit design to perform some or all of the operations to implement the present invention. Further, the special purpose processor 2504B may be a hybrid processor, which includes dedicated circuitry for performing a subset of functions, and other circuits for performing more general functions such as responding to computer program 2510 instructions. In one embodiment, the special purpose processor 2504B is an application specific integrated circuit (ASIC).

The computer 2502 may also implement a compiler 2512 that allows an application or computer program 2510 written in a programming language such as C, C++, Assembly, SQL, PYTHON, PROLOG, MATLAB, RUBY, RAILS, HASKELL, or other language to be translated into processor 2504 readable code. Alternatively, the compiler 2512 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 2510 accesses and manipulates data accepted from I/O devices and stored in the memory 2506 of the computer 2502 using the relationships and logic that were generated using the compiler 2512.

The computer 2502 also optionally comprises an external communication device such as a modem, satellite link, Ethernet card, or other device for accepting input from, and providing output to, other computers 2502.

In one embodiment, instructions implementing the operating system 2508, the computer program 2510, and the compiler 2512 are tangibly embodied in a non-transitory computer-readable medium, e.g., data storage device 2520, which could include one or more fixed or removable data storage devices, such as a zip drive, floppy disc drive 2524, hard drive, CD-ROM drive, tape drive, etc. Further, the operating system 2508 and the computer program 2510 are comprised of computer program 2510 instructions which, when accessed, read and executed by the computer 2502, cause the computer 2502 to perform the steps necessary to implement and/or use the present invention or to load the program of instructions into a memory 2506, thus creating a special purpose data structure causing the computer 2502 to operate as a specially programmed computer executing the method steps described herein. Computer program 2510 and/or operating instructions may also be tangibly embodied in memory 2506 and/or data communications devices 2530, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 2502.

Figure 26:
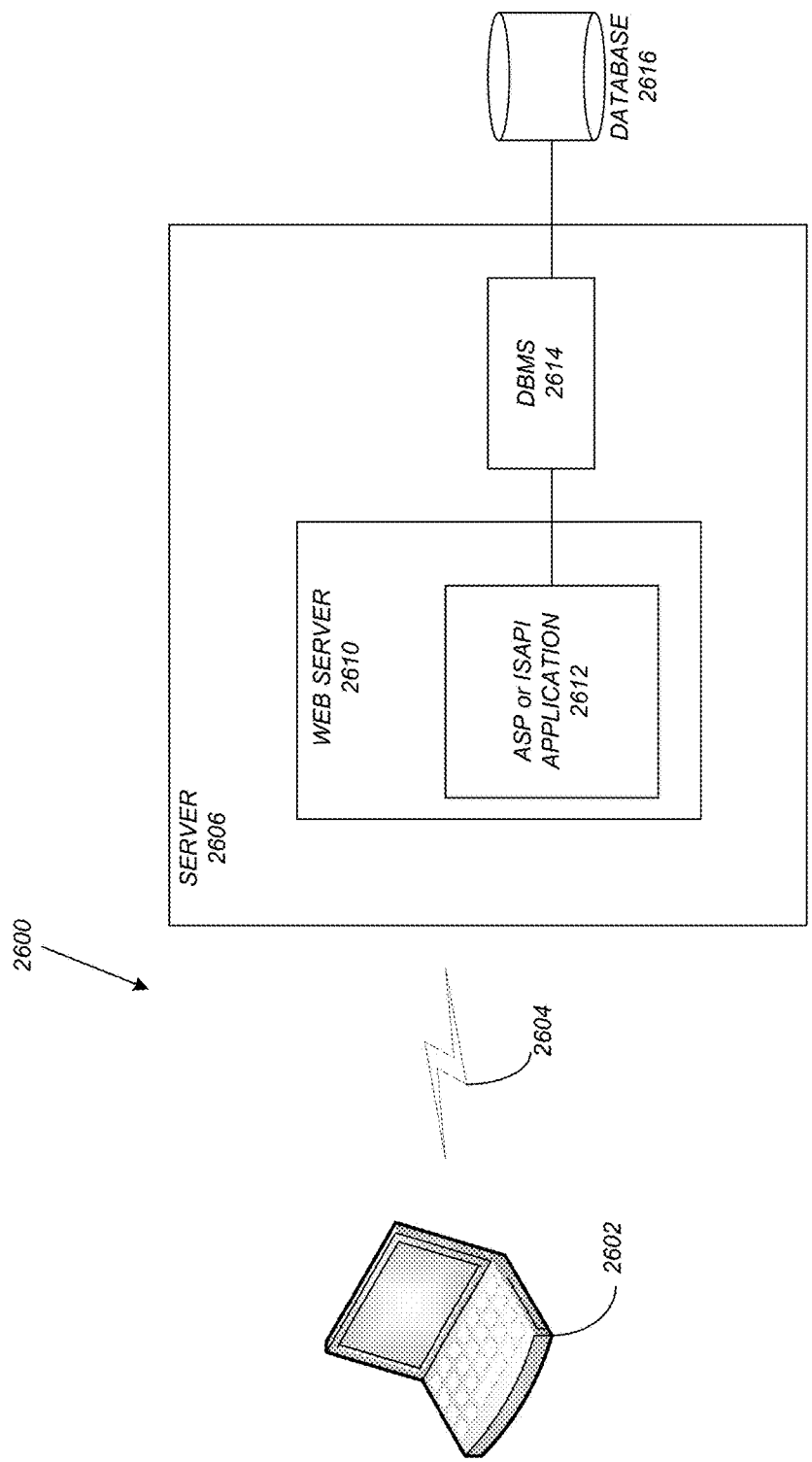
FIG. 26 schematically illustrates a typical distributed/cloud-based computer system using a network to connect client computers to server computers in accordance with one or more embodiments of the invention.

FIG. 26 schematically illustrates a typical distributed/cloud-based computer system 2600 using a network 2604 to connect client computers 2602 to server computers 2606. A typical combination of resources may include a network 2604 comprising the Internet, LANs (local area networks), WANs (wide area networks), SNA (systems network architecture) networks, or the like, clients 2602 that are personal computers or workstations (as set forth in FIG. 25), and servers 2606 that are personal computers, workstations, minicomputers, or mainframes (as set forth in FIG. 25). However, it may be noted that different networks such as a cellular network (e.g., GSM [global system for mobile communications] or otherwise), a satellite based network, or any other type of network may be used to connect clients 2602 and servers 2606 in accordance with embodiments of the invention.

A network 2604 such as the Internet connects clients 2602 to server computers 2606. Network 2604 may utilize Ethernet, coaxial cable, wireless communications, radio frequency (RF), etc. to connect and provide the communication between clients 2602 and servers 2606. Further, in a cloud-based computing system, resources (e.g., storage, processors, applications, memory, infrastructure, etc.) in clients 2602 and server computers 2606 may be shared by clients 2602, server computers 2606, and users across one or more networks. Resources may be shared by multiple users and can be dynamically reallocated per demand. In this regard, cloud computing may be referred to as a model for enabling access to a shared pool of configurable computing resources.

Clients 2602 may execute a client application or web browser and communicate with server computers 2606 executing web servers 2610. Such a web browser is typically a program such as MICROSOFT INTERNET EXPLORER, MOZILLA FIREFOX, OPERA, APPLE SAFARI, GOOGLE CHROME, etc. Further, the software executing on clients 2602 may be downloaded from server computer 2606 to client computers 2602 and installed as a plug-in or ACTIVEX control of a web browser. Accordingly, clients 2602 may utilize ACTIVEX components/component object model (COM) or distributed COM (DCOM) components to provide a user interface on a display of client 2602. The web server 2610 is typically a program such as MICROSOFT'S INTERNET INFORMATION SERVER.

Web server 2610 may host an Active Server Page (ASP) or Internet Server Application Programming Interface (ISAPI) application 2612, which may be executing scripts. The scripts invoke objects that execute business logic (referred to as business objects). The business objects then manipulate data in database 2616 through a database management system (DBMS) 2614. Alternatively, database 2616 may be part of, or connected directly to, client 2602 instead of communicating/obtaining the information from database 2616 across network 2604. When a developer encapsulates the business functionality into objects, the system may be referred to as a component object model (COM) system. Accordingly, the scripts executing on web server 2610 (and/or application 2612) invoke COM objects that implement the business logic. Further, server 2606 may utilize MICROSOFT'S TRANSACTION SERVER (MTS) to access required data stored in database 2616 via an interface such as ADO (Active Data Objects), OLE DB (Object Linking and Embedding DataBase), or ODBC (Open DataBase Connectivity).

Generally, these components 2600-2616 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 2602 and 2606 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 2602 and 2606. Further, embodiments of the invention are implemented as a software application on a client 2602 or server computer 2606. Further, as described above, the client 2602 or server computer 2606 may comprise a thin client device or a portable device that has a multi-touch-based display.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[1] Perez Patrick, Michel Gangnet, and Andrew Blake. "Poisson image editing." ACM Transactions on Graphics. Vol. 22. No. 3. ACM, 2003.

[2] Kwatra, Vivek, et al. "Graphcut textures: image and video synthesis using graph cuts." ACM Transactions on Graphics. Vol. 22. No. 3. ACM, 2003.

[3] Barnes, Connelly, et al. "PatchMatch: a randomized correspondence algorithm for structural image editing." ACM Transactions on Graphics 28.3 (2009): 24.

What is claimed is:

1. A computer-implemented method for generating a texture unit for seamless tiling comprising:
    (a) obtaining, in a computer with a processor, a source image;
    (b) identifying, by the processor, a sample unit comprising a part of the source image where texture is of interest, wherein the sample unit comprises multiple pixels including non-continuous border pixels and continuous pixels;
    (c) splitting, by the processor, the sample unit into multiple parts using a horizontal cut or a vertical cut;
    (d) generating, by the processor, a shuffled sample unit by moving each of the multiple parts to a center-symmetric position based on the horizontal cut or the vertical cut, wherein:
        (1) the non-continuous border pixels of each of the multiple parts move to a center of the shuffled sample unit; and
        (2) the continuous pixels of each of the multiple parts move to borders of the shuffled sample unit;
    (e) generating, by the processor, a mask by selecting one or more of the multiple pixels from the sample unit; and
    (f) overlaying, by the processor, the mask on top of corresponding pixels in the shuffled sample unit to generate the texture unit.

2. The computer-implemented method of claim 1, further comprising:
    extracting a luminance channel from the sample unit;
    computing a light gradient image of the sample unit based on the luminance channel; and
    computing a new value of each of the multiple pixels in the sample unit based on the light gradient image.

3. The computer-implemented method of claim 2, wherein the computing the light gradient image comprises:
    applying Gaussian smoothing to the luminance channel with a kernel size as large as a size of the sample unit to generate an approximate light gradient image; and
    linearly scaling pixel values in the approximate light gradient image using a user tunable parameter to generate the light gradient image.

4. The computer-implemented method of claim 2, wherein the computing the new value of each of the multiple pixels comprises:
    for each of the multiple pixels, dividing an old pixel value in the sample unit by a corresponding value in the light gradient image.

5. The computer-implemented method of claim 1, wherein the generating the mask comprises:
    utilizing the sample unit as a first input;
    utilizing the shuffled sample unit as a second input;
    outputting the mask based on the first input and the second input wherein:
        an initial mask comprises one or more border pixels from the shuffled sample unit, one or more center pixels from the sample unit, and one or more unknown pixels to be determined;
        the one or more border pixels are located on a border of the shuffled sample unit;
        the one or more center pixels are from the sample unit and cover an area that corresponds to the non-continuous border pixels of the shuffled sample unit;
        a cut line in the initial mask separates neighboring pixels, wherein the cut line determines if the one or more unknown pixels are from the sample unit or from the shuffled sample unit;

the cut line is based on a measure of color difference between pairs of neighboring pixels, and neighboring pixels closest in color determine whether an unknown pixel is from the sample unit or the shuffled sample unit; and the mask that is output is determined from the initial mask and the cut line.

6. The computer-implemented method of claim 5, wherein the one or more center pixels cover an area that is diamond shaped.

7. The computer-implemented method of claim 6, further comprising:

providing a Bezier curve tool along the area, wherein the Bezier curve tool accepts user input to adjust a shape of the initial mask.

8. The computer-implemented method of claim 1, further comprising:

selecting an area of the texture unit; and filling in the area based on nearby pixels.

9. The computer-implemented method of claim 8, wherein the filling in the area removes details in the texture unit that might cause visual artifacts.

10. The computer-implemented method of claim 1, further comprising:

generating a tiled image by repeatedly utilizing the texture unit as a tile.

11. A system for generating a texture unit for seamless tiling comprising:

(a) a computer having a memory;
(b) a source image stored on the computer;
(c) a processor executing in the computer, wherein the processor:

(1) identifies a sample unit comprising a part of the source image where texture is of interest, wherein the sample unit comprises multiple pixels including non-continuous border pixels and continuous pixels;

(2) splits the sample unit into multiple parts using a horizontal cut or a vertical cut;

(3) generates a shuffled sample unit by moving each of the multiple parts to a center-symmetric position based on the horizontal cut or the vertical cut, wherein:

(A) the non-continuous border pixels of each of the multiple parts move to a center of the shuffled sample unit; and (B) the continuous pixels of each of the multiple parts move to borders of the shuffled sample unit;

(4) generates a mask by selecting one or more of the multiple pixels from the sample unit; and (5) overlays the mask on top of corresponding pixels in the shuffled sample unit to generate the texture unit.

12. The system of claim 11, wherein the processor further:
extracts a luminance channel from the sample unit;
computes a light gradient image of the sample unit based on the luminance channel; and
computes a new value of each of the multiple pixels in the sample unit based on the light gradient image.

13. The system of claim 12, wherein the processor computes the light gradient image by:

applying Gaussian smoothing to the luminance channel with a kernel size as large as a size of the sample unit to generate an approximate light gradient image; and linearly scaling pixel values in the approximate light gradient image using a user tunable parameter to generate the light gradient image.

14. The system of claim 12, wherein the processor computes the new value of each of the multiple pixels by:

for each of the multiple pixels, dividing an old pixel value in the sample unit by a corresponding value in the light gradient image.

15. The system of claim 11, wherein the processor generates the mask by:

utilizing the sample unit as a first input;

utilizing the shuffled sample unit as a second input;

outputting the mask based on the first input and the second input wherein:

an initial mask comprises one or more border pixels from the shuffled sample unit, one or more center pixels from the sample unit, and one or more unknown pixels to be determined;

the one or more border pixels are located on a border of the shuffled sample unit;

the one or more center pixels are from the sample unit and cover an area that corresponds to the non-continuous border pixels of the shuffled sample unit;

a cut line in the initial mask separates neighboring pixels, wherein the cut line determines if the one or more unknown pixels are from the sample unit or from the shuffled sample unit;

the cut line is based on a measure of color difference between pairs of neighboring pixels, and neighboring pixels closest in color determine whether an unknown pixel is from the sample unit or the shuffled sample unit; and the mask that is output is determined from the initial mask and the cut line.

16. The system of claim 15, wherein the one or more center pixels cover an area that is diamond shaped.

17. The system of claim 16, wherein the processor further:
provides a Bezier curve tool along the area, wherein the Bezier curve tool accepts user input to adjust a shape of the initial mask.

18. The system of claim 11, wherein the processor further:
selects an area of the texture unit; and
fills in the area based on nearby pixels.

19. The system of claim 18, wherein the processor fills in the area removes details in the texture unit that might cause visual artifacts.

20. The system of claim 11, wherein the processor further:
generates a tiled image by repeatedly utilizing the texture unit as a tile.

* * * * *